United States Patent [19]

Colburn

[11] Patent Number: 5,189,626
[45] Date of Patent: Feb. 23, 1993

[54] AUTOMATIC GENERATION OF A SET OF CONTIGUOUS SURFACE PATCHES ON A COMPUTER MODELED SOLID

[75] Inventor: Stephen Colburn, Eureka, Ill.
[73] Assignee: Caterpillar Inc., Peoria, Ill.
[21] Appl. No.: 675,761
[22] Filed: Mar. 27, 1991
[51] Int. Cl.$^5$ .................. G06F 15/60; G06F 15/62
[52] U.S. Cl. .................. 364/474.24; 364/512; 395/120; 395/161
[58] Field of Search .......... 364/474.24, 474.29, 364/468, 512, 578; 395/120, 121, 122, 123, 129, 141, 119, 161; 340/723, 729

[56] References Cited

U.S. PATENT DOCUMENTS

| | | | |
|---|---|---|---|
| 4,475,104 | 10/1984 | Shen | 395/122 |
| 4,609,917 | 9/1986 | Shen | 340/729 |
| 4,694,404 | 9/1987 | Meagher | 395/123 |
| 4,791,583 | 12/1988 | Colburn | 395/120 |
| 4,890,242 | 12/1989 | Sinha et al. | 395/120 |
| 4,937,768 | 3/1989 | Carver et al. | 364/474.24 |
| 5,119,309 | 6/1992 | Cavendish et al. | 364/474.24 |

OTHER PUBLICATIONS

Publication: IEEE Computer Graphics & Applications, v. 3(8), pp. 45-51, "Surface Triangulation for Picture Production", By: B. Wordenweber, date: Nov. 1983.
Publication: International Journal for Numerical Methods In Engineering, vol. 21, pp. 329-347, "An Approach to Automatic Three-Dimensional Finite Element Mesh Generation", By: J. C. Cavendish et al., Date: 1985.
Publication: Engineering With Computers, pp. 61-71, "Finite Element Modeling Within An Integrated Geometric Modeling Environment: Part I-Mesh Generation", By: M. S. Shephard, Date: 1985.
Publication: Engineering With Computers, pp. 73-85, "Finite Element Modeling Within an Integrated Geometric Modeling Environment: Part II-Attribute Specification, Domain Differences, and Indirect Element Types", By: M. S. Shephard, Date: 1985.
Publication: Adv. Eng. Software, vol. 9, No. 1, pp. 34-55, "A Fast Algorithm For Constructing Delaunay Triangulations In The Plane", By: S. W. Sloan, Date: 1987.
Publication: IEEE Computer Graphics & Applications, pp. 33-41, "Adaptive Polygonalization of Implicitly Defined Surfaces", By: M. Hall et al., Date: Nov. 1990.
Publication: (To Appear) Applied Mechanics Review, "Integration of Geometric Modeling and Advanced Finite Element Preprocessing", By: M. S. Shephard et al. date unknown.
Publication: (To Appear) Applied Mechanics Review, "Approaches To The Automatic Generation and Control of Finite Element Meshes", By: M. S. Shephard; date unknown.
Publication: (To Appear) Communications in Applied Numerial Methods, "The Versatility of Automatic Mesh Generators Based On Tree Structures and Advanced Geometric Constructs", By: M. S. Shephard et al; date unknown.

Primary Examiner—Joseph Ruggiero
Attorney, Agent, or Firm—David M. Masterson

[57] ABSTRACT

A method of operating a computer for generating a plurality of machine tool paths for machining an object from a set of contiguous surface patches arranged on and approximating a computer representation of a solid model is provided. The method includes the steps constructing an equilateral triangle defined by a plurality of surface points, each surface point having a gradient vector substantially normal to the surface of the blended solid model. Using this triangle as a starting point, a series of steps are performed. A current edge having end points is determined from one of the constructed triangle edges. A candidate point positioned equidistant from the end points of the current edge is generated on the blended surface exterior to the constructed triangle. A subsequent triangle is constructed from the candidate point using the current edge as the subsequent triangle base. The subsequent triangle is defined by a plurality of surface points, each surface point having a gradient vector substantially normal to the surface of the solid model. The series of steps are repeated in sequential order upon a previously constructed triangle until the resulting triangular mesh covers a predetermined portion of the solid model. The set of surface points and corresponding gradient vectors which define the surfaces are used to define the set of surface patches and generate the plurality of machine tool paths corresponding to the blended surface for machining the object.

18 Claims, 22 Drawing Sheets

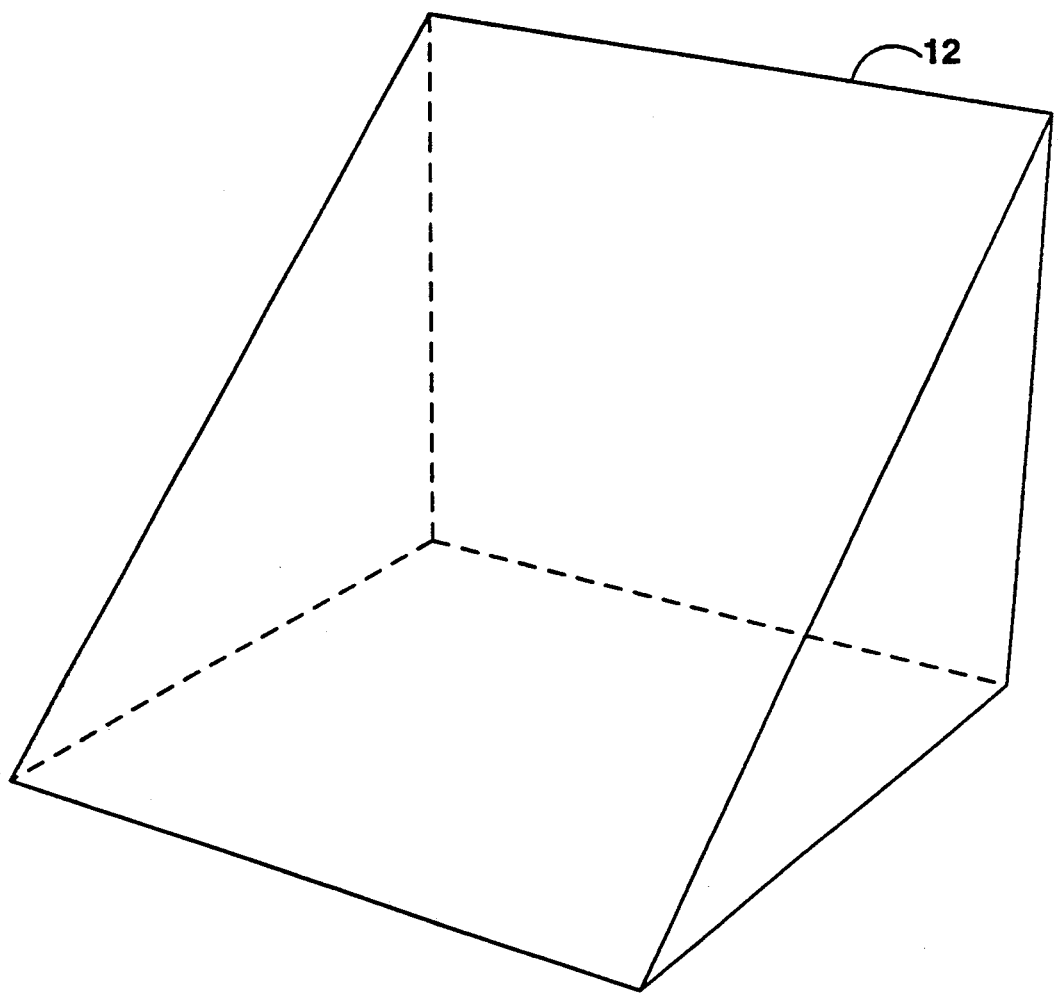
Fig_1

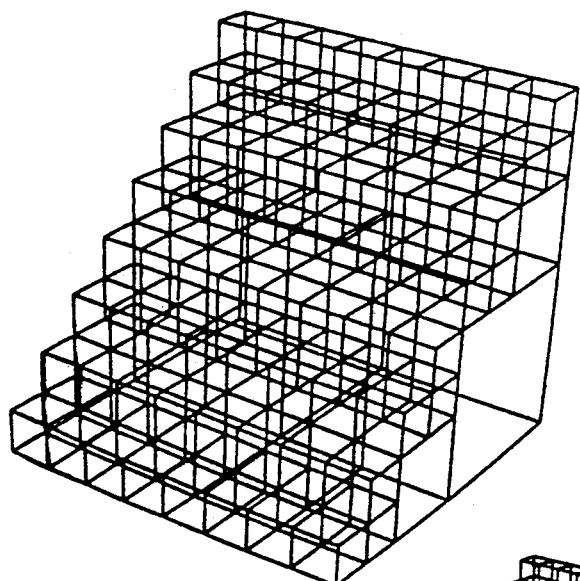
Fig_2A_
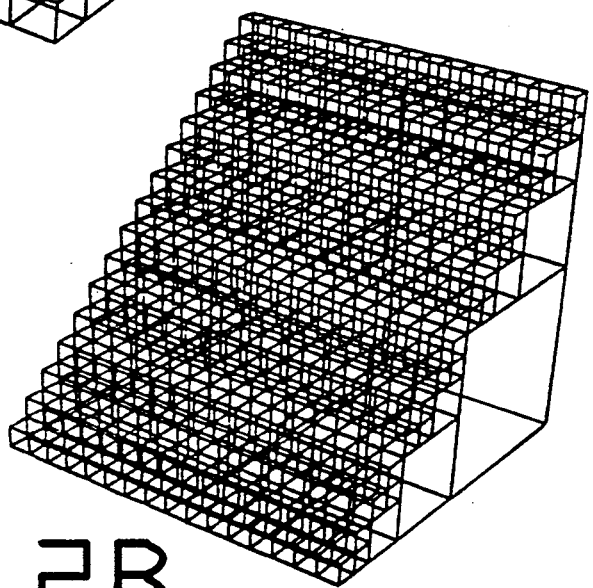
Fig_2B_
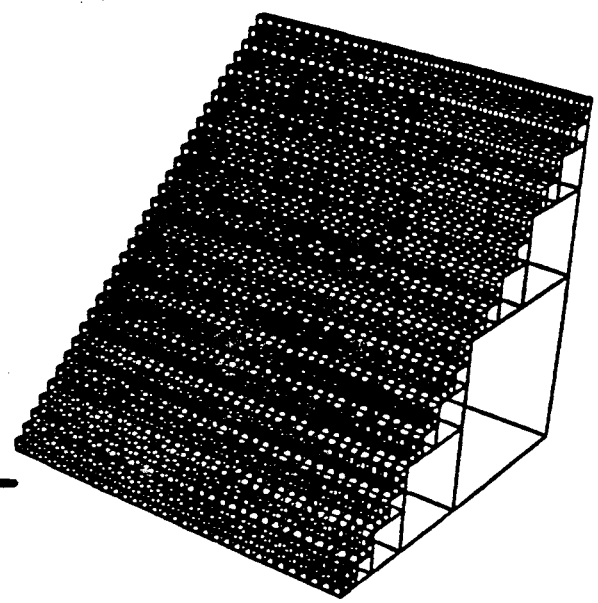
Fig_2C_

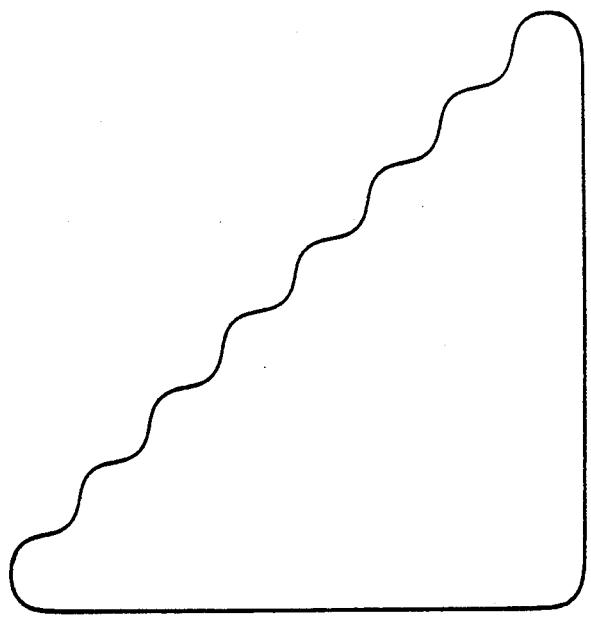
Fig_3A_
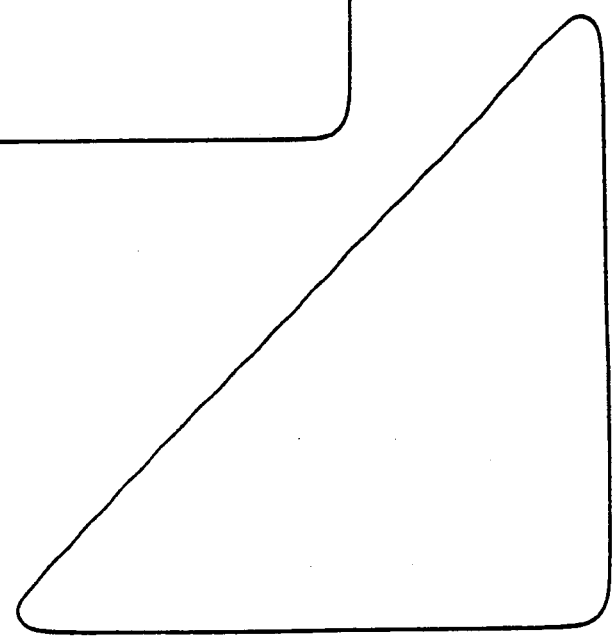
Fig_3B_
Fig_3C_
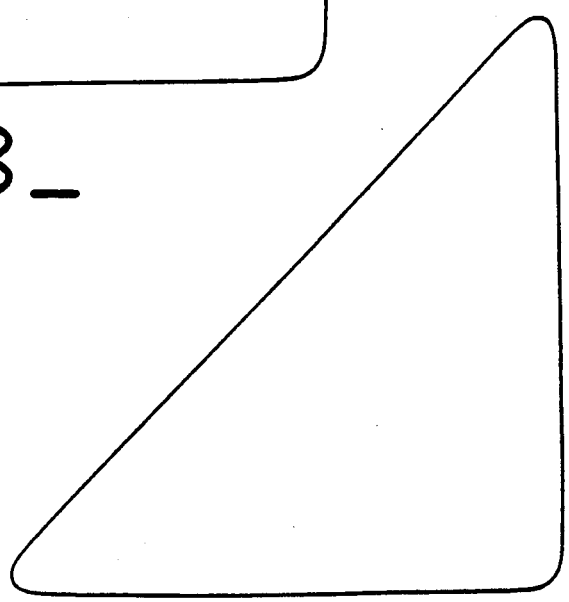

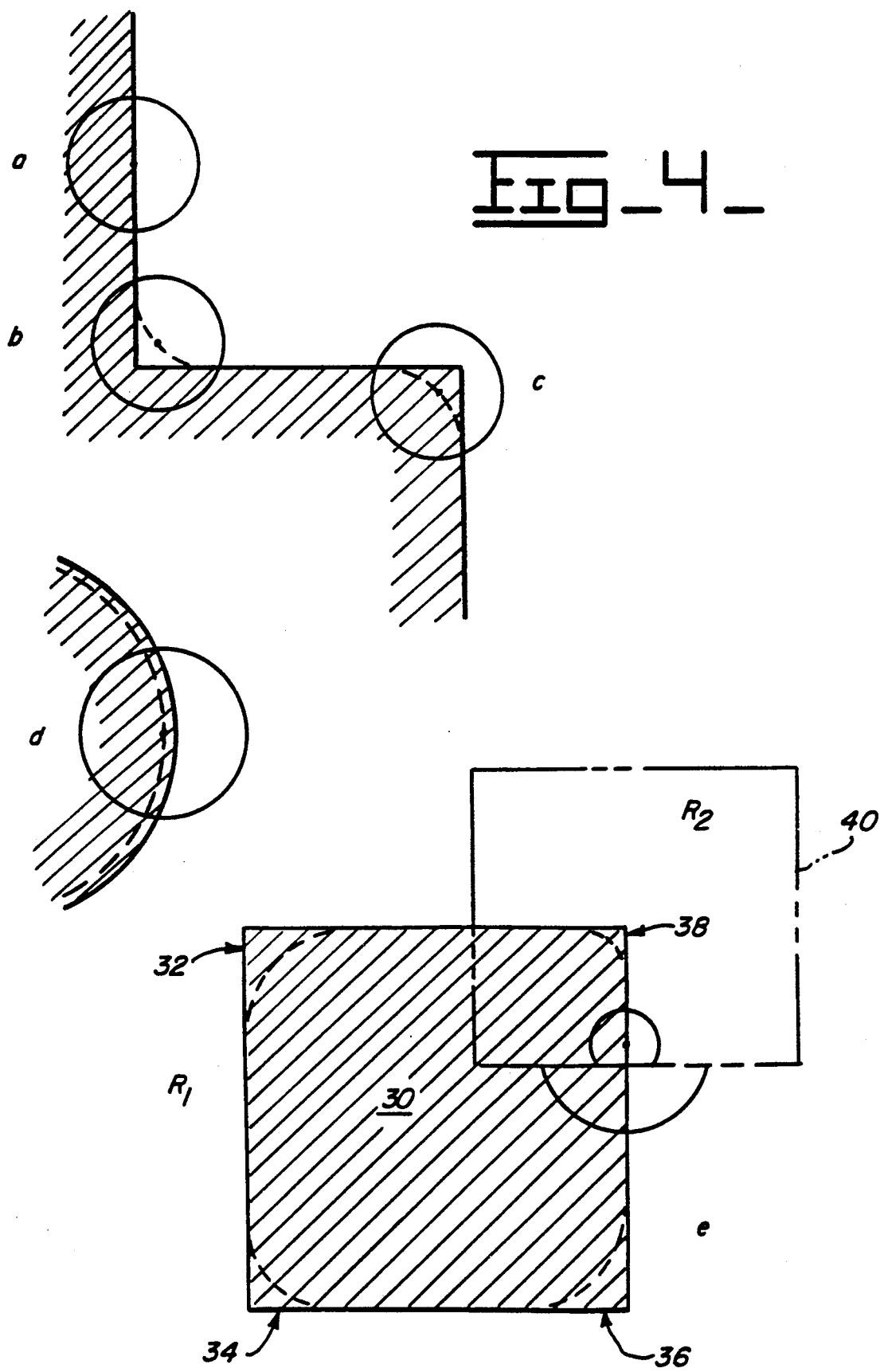
Fig_4_

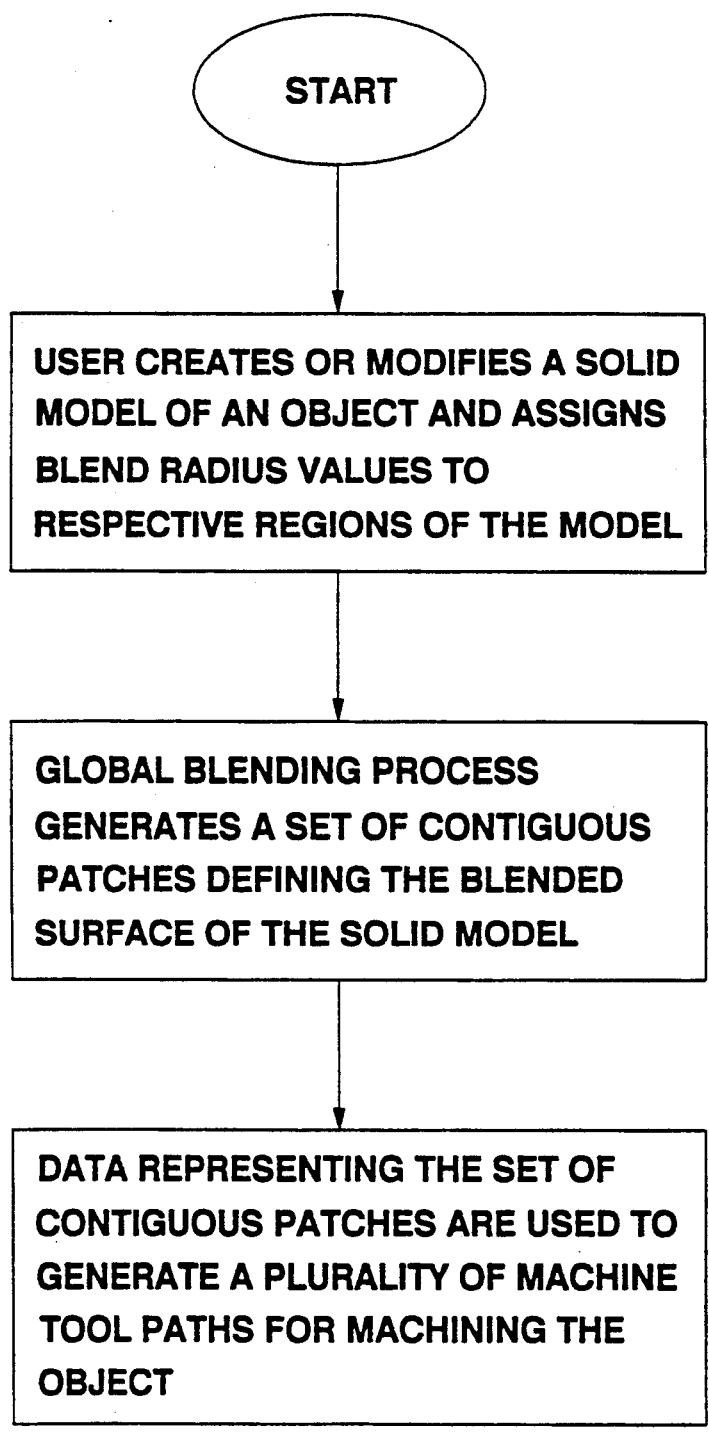
Fig_5_

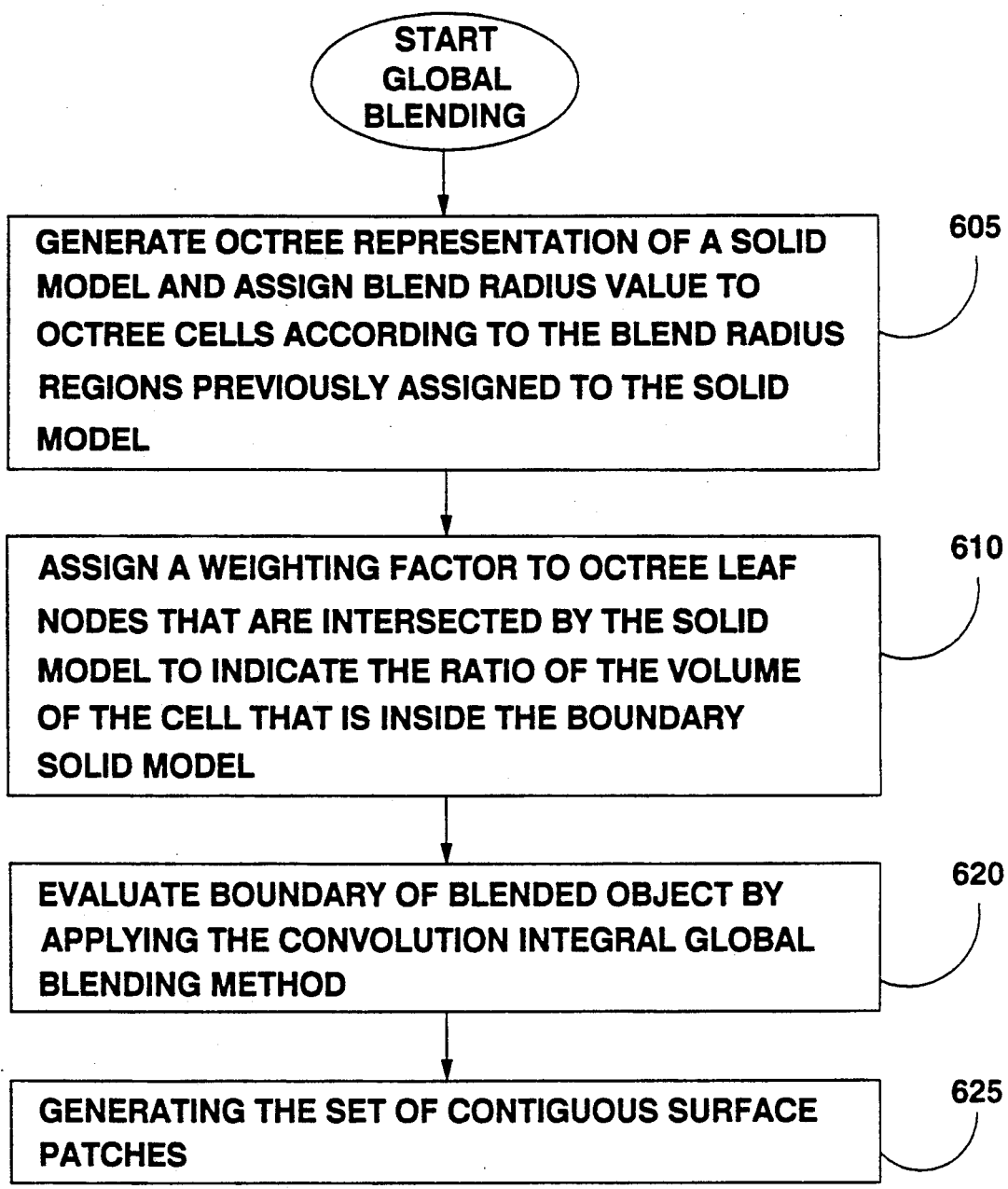
Fig_6_

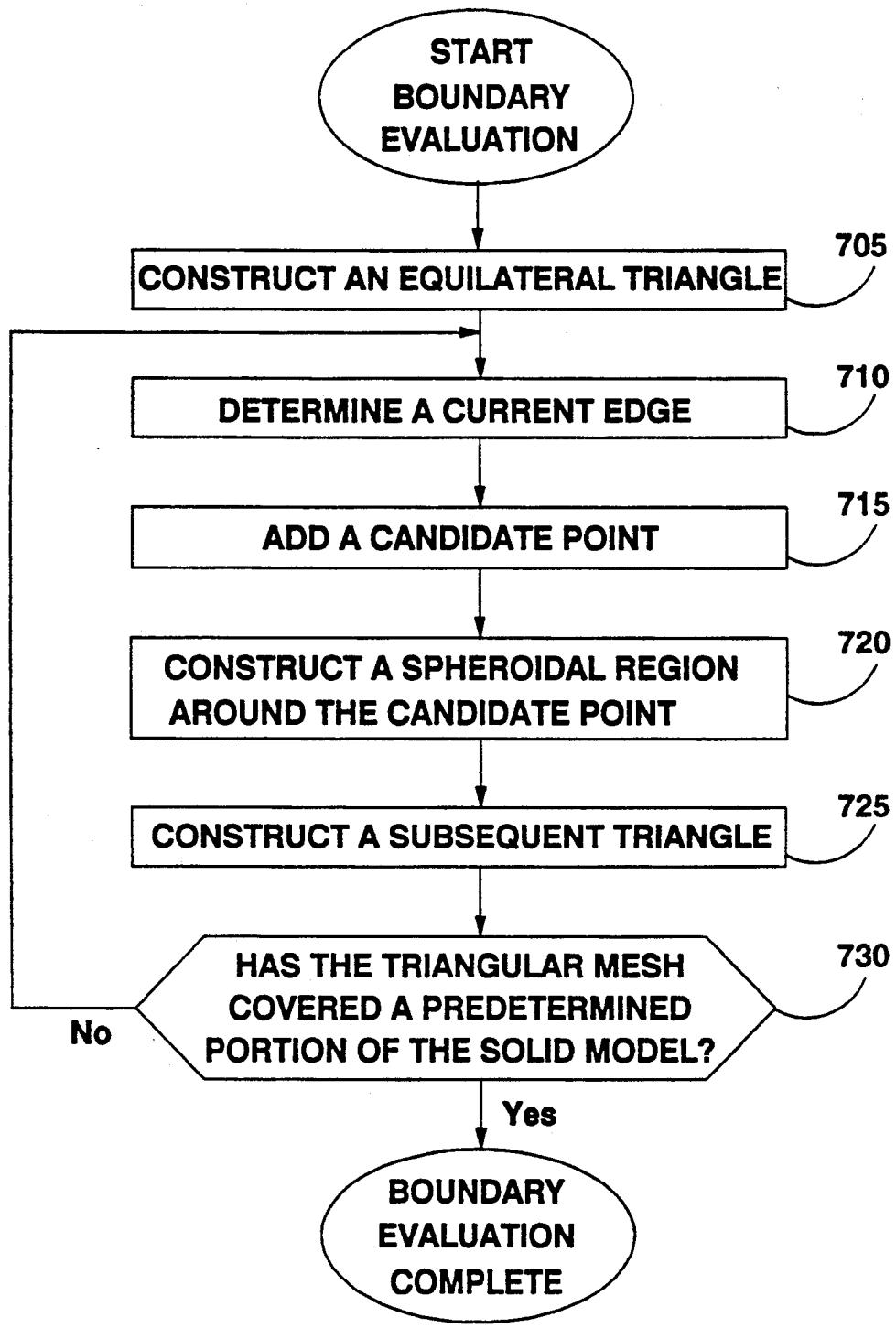
Fig_7_

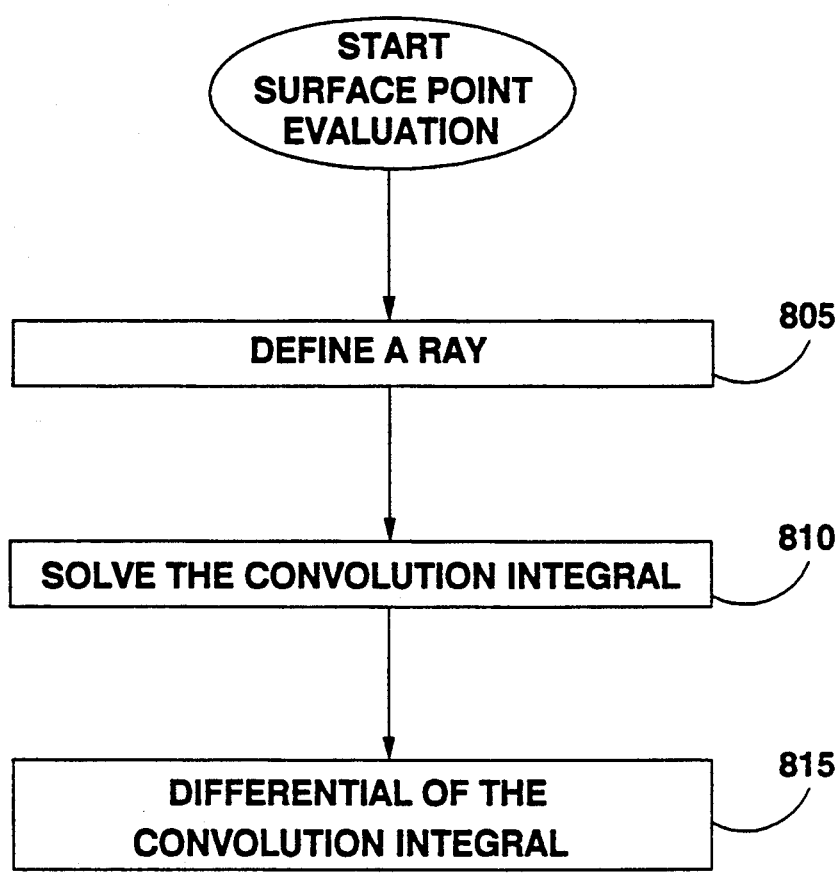
Fig_8_

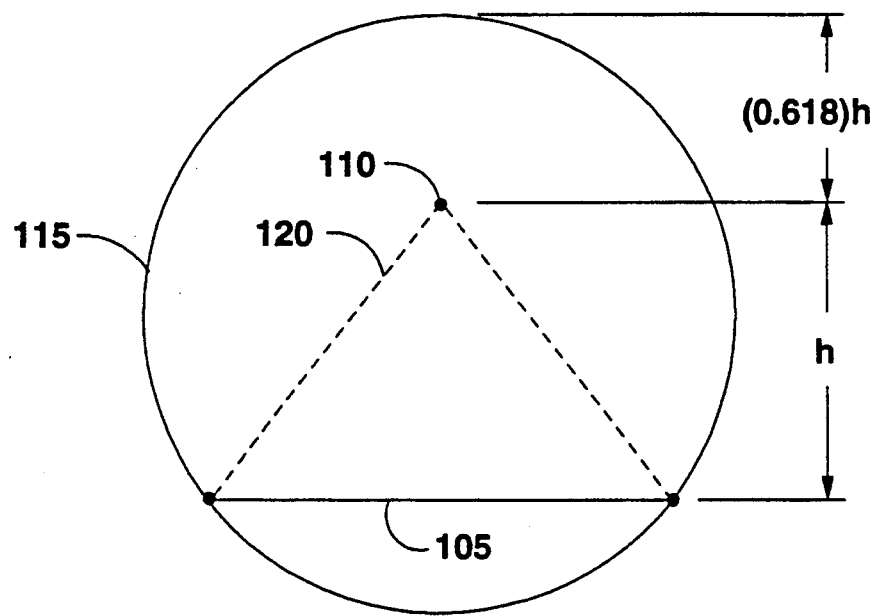
Fig_9_

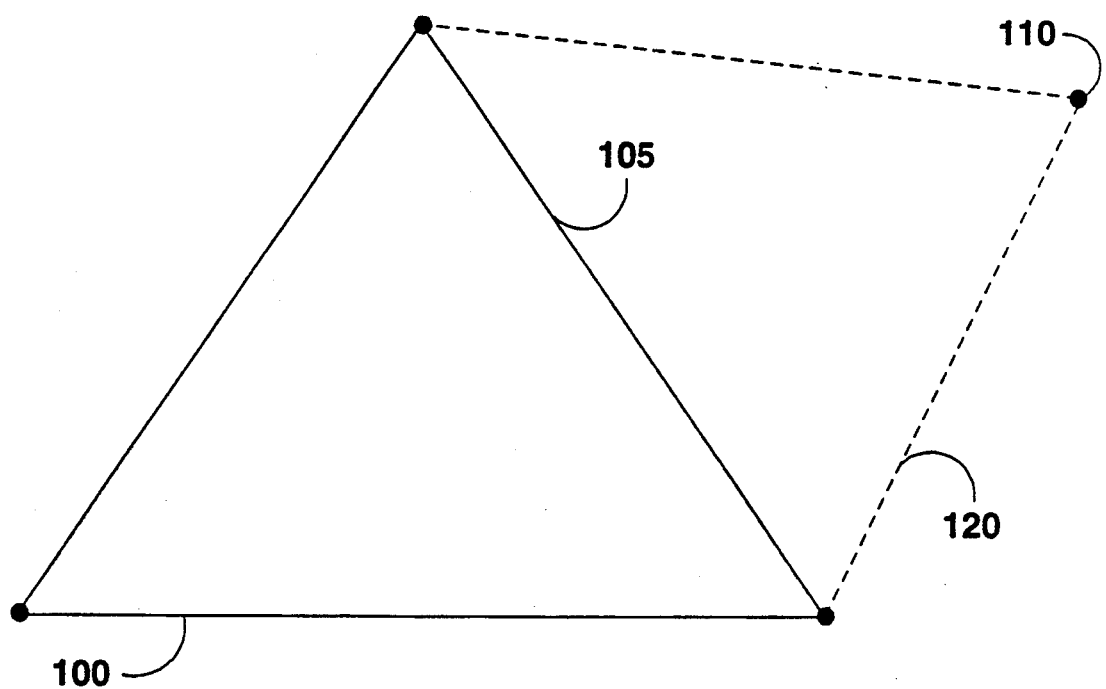
Fig_10_

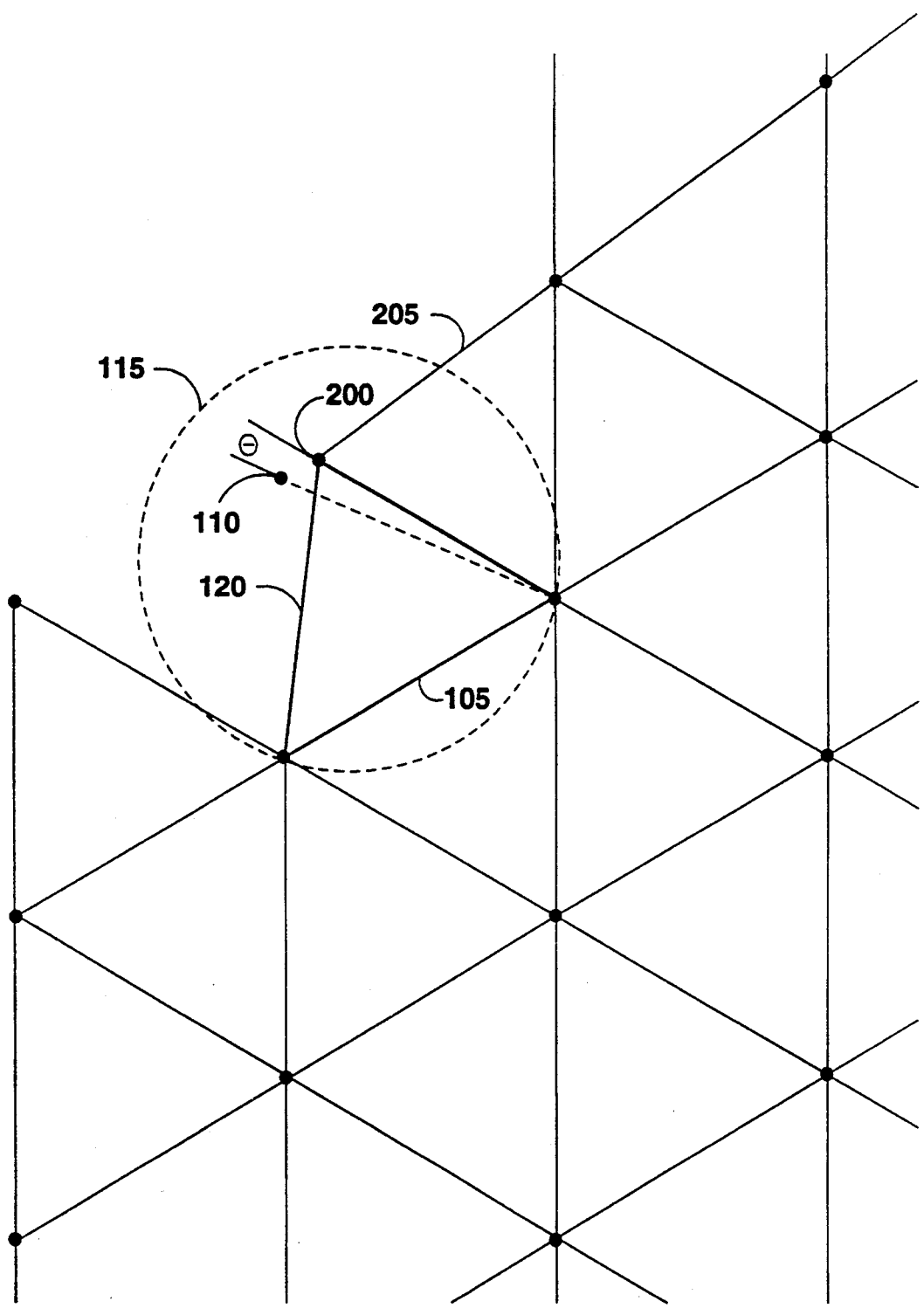
Fig_11_

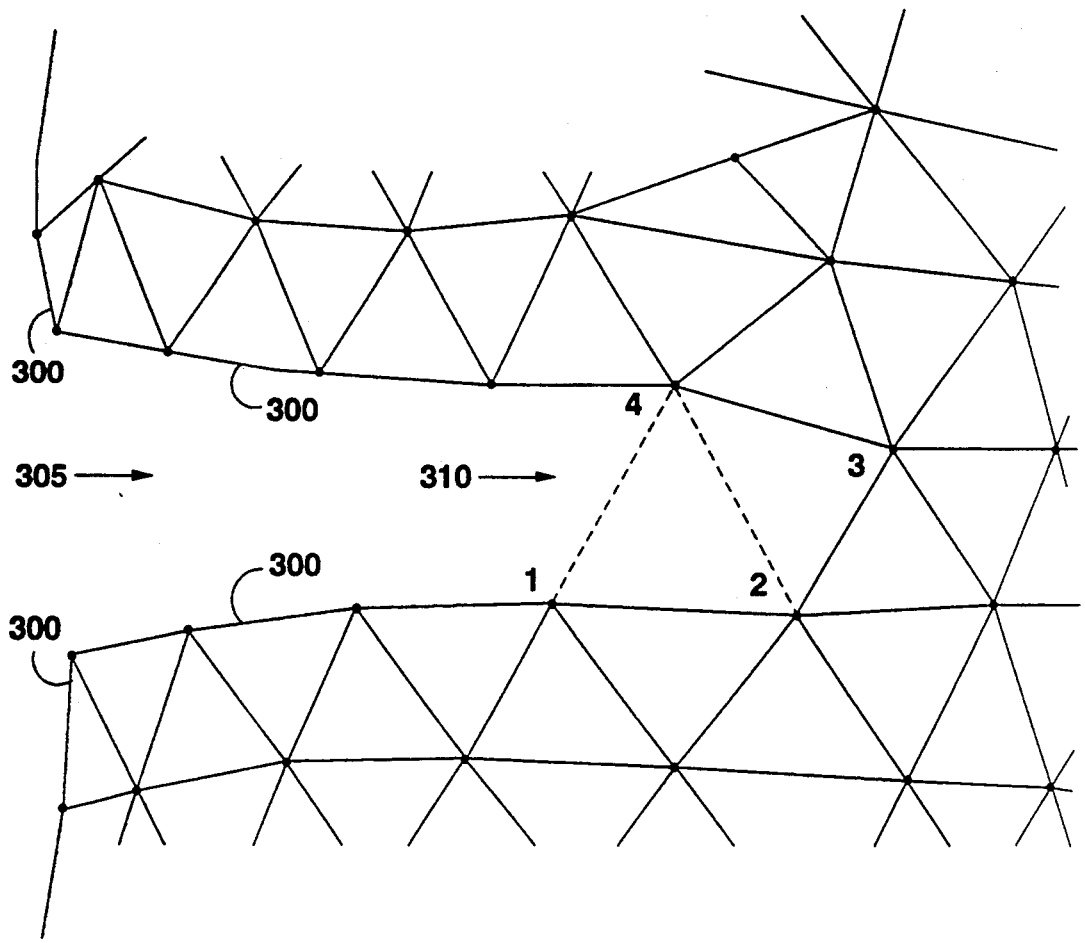
Fig_12_

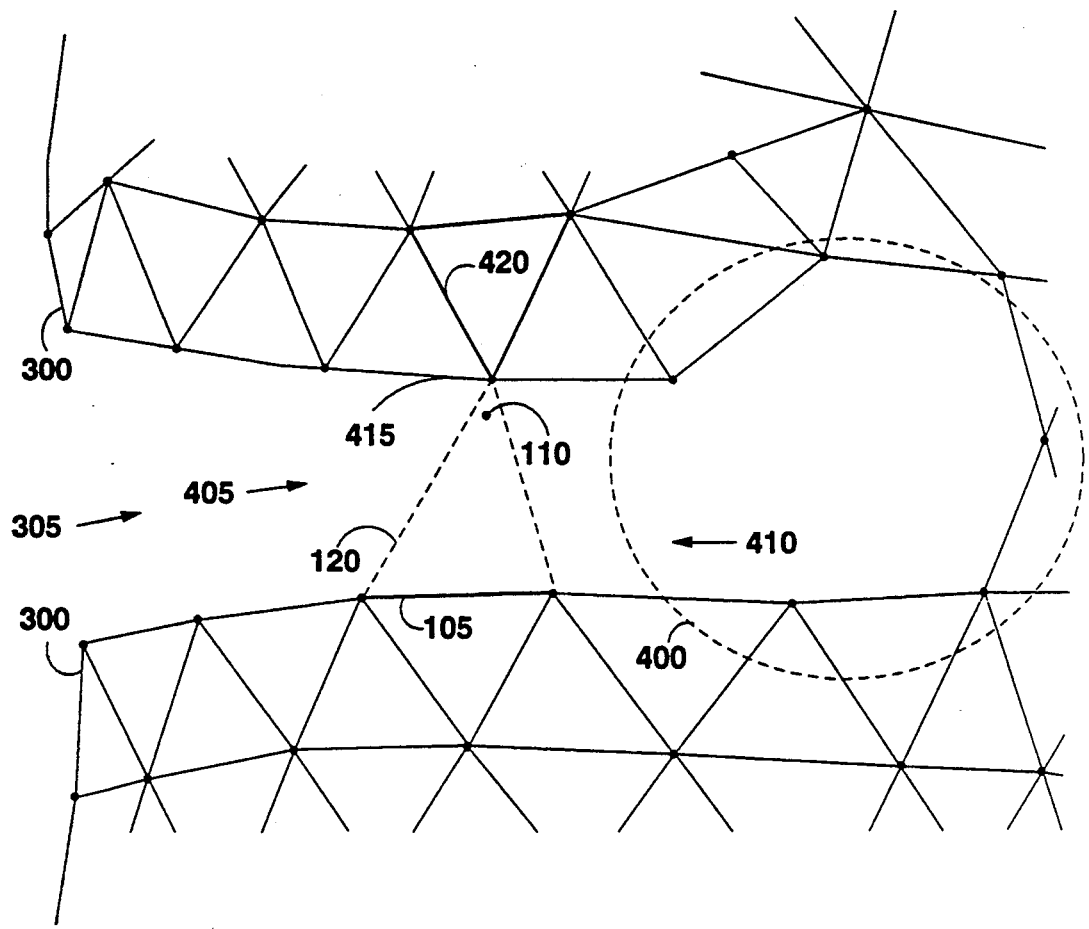
Fig_13_

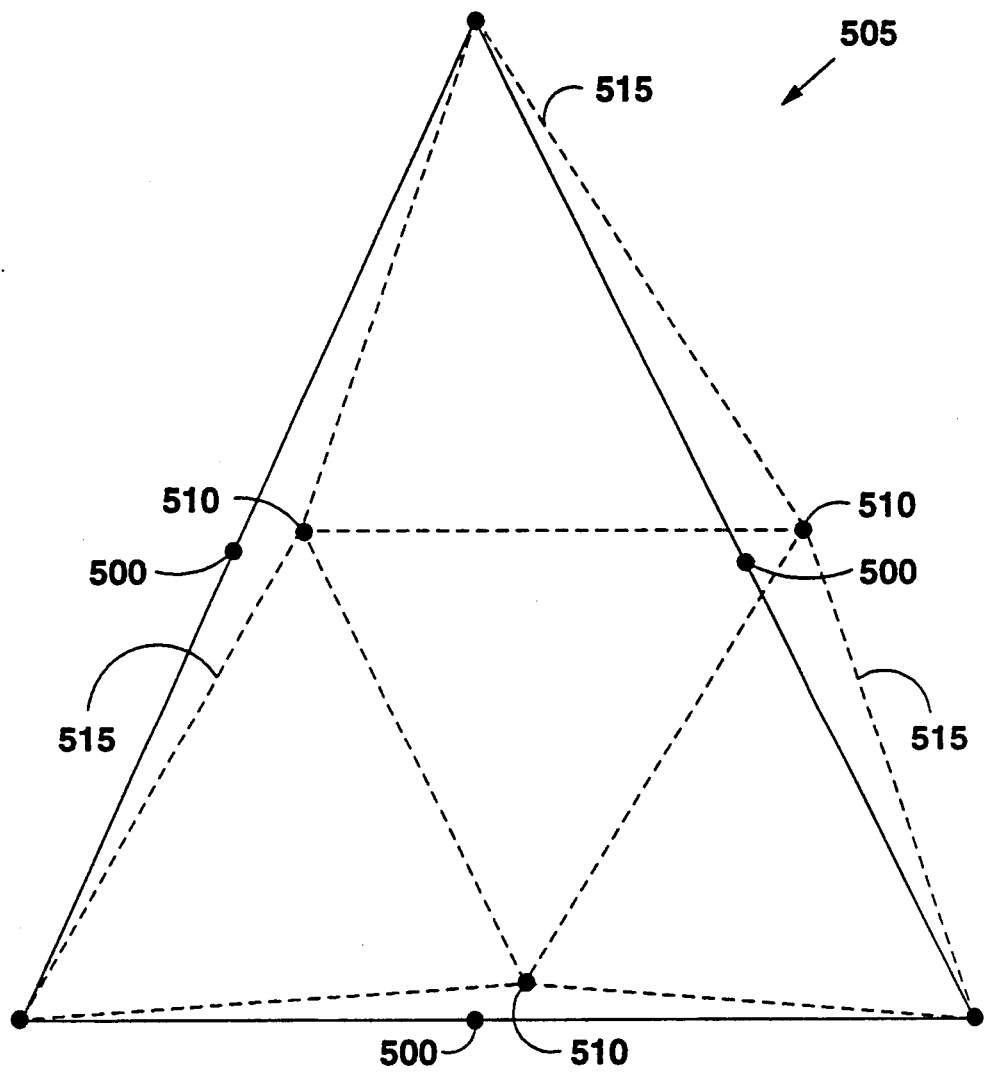
Fig_14_

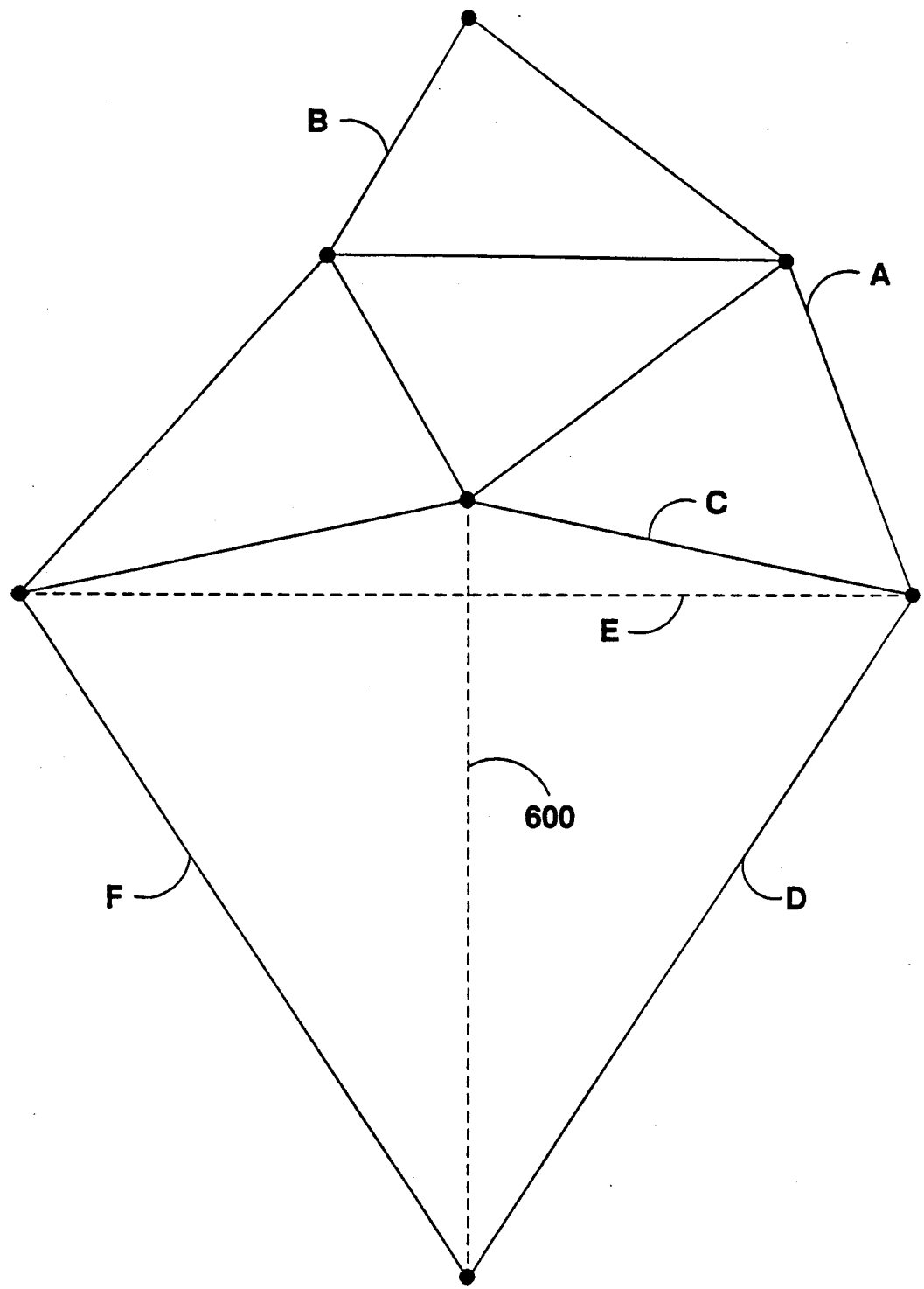
Fig_15_

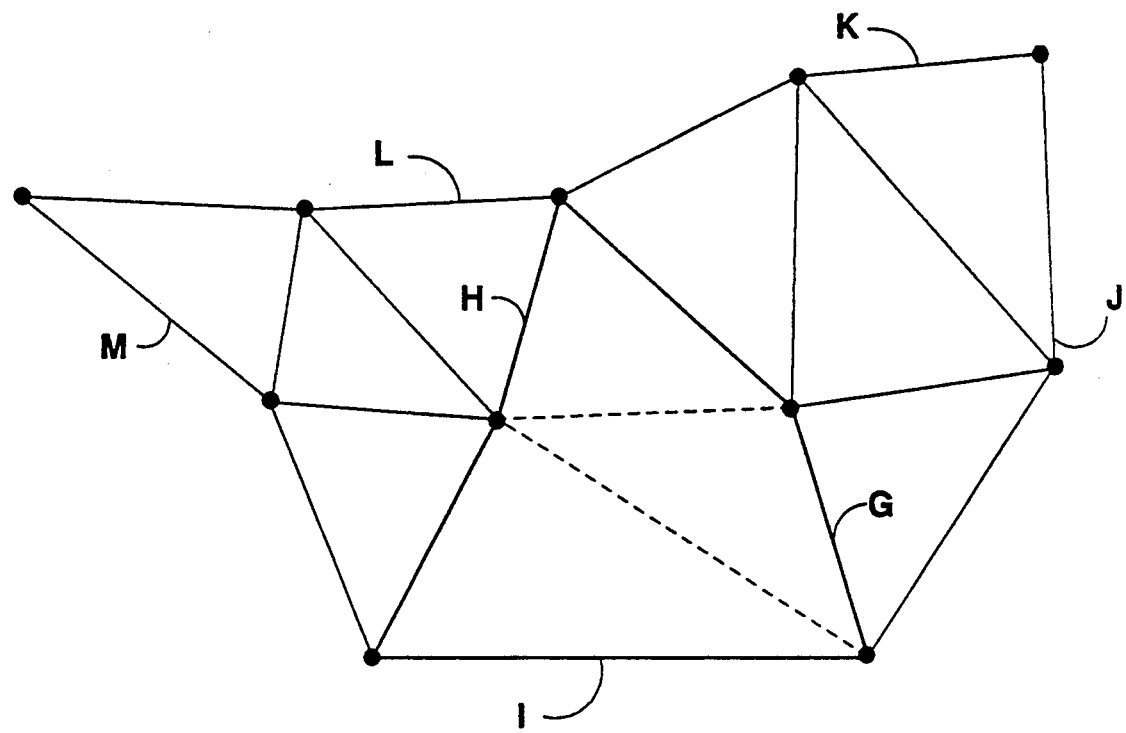
Fig_16_

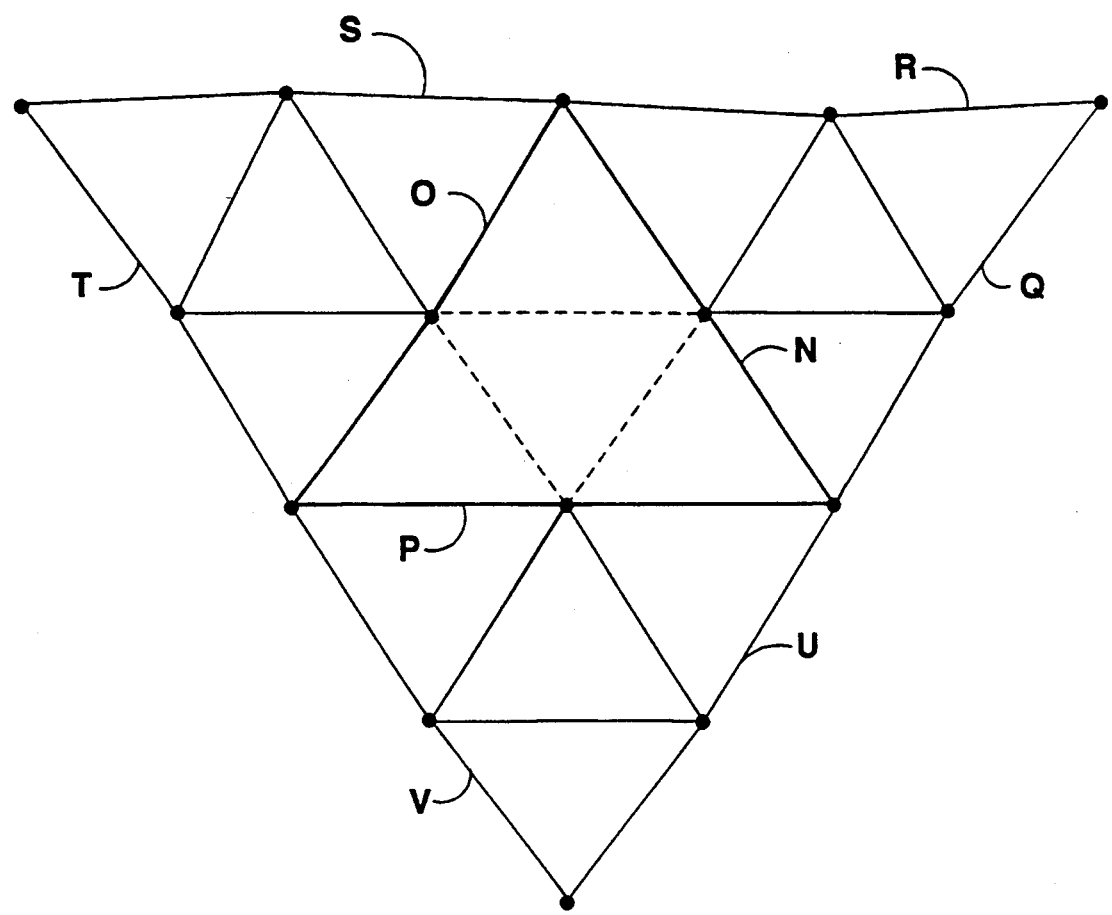
Fig_17_

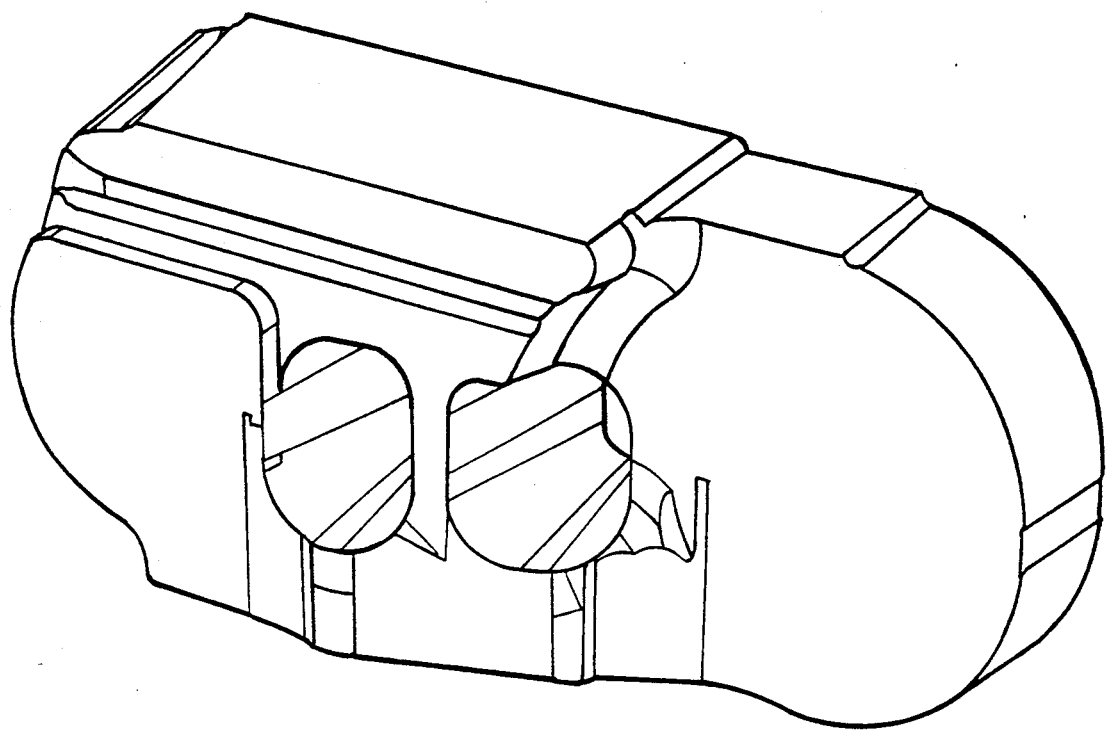
Fig_18_

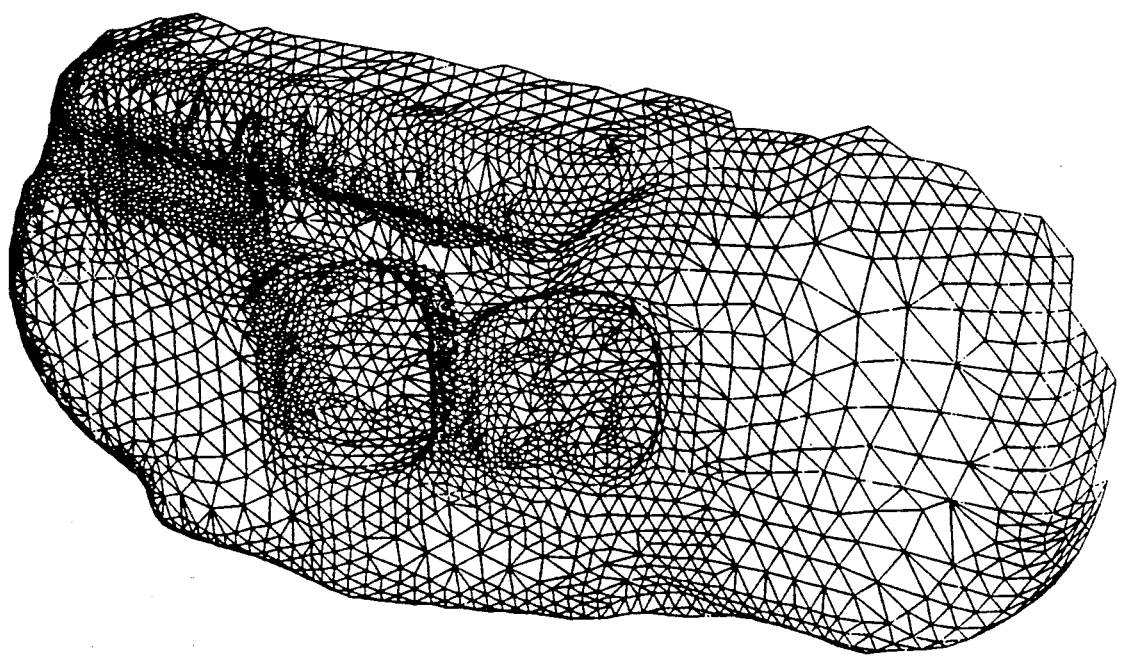
Fig_19_

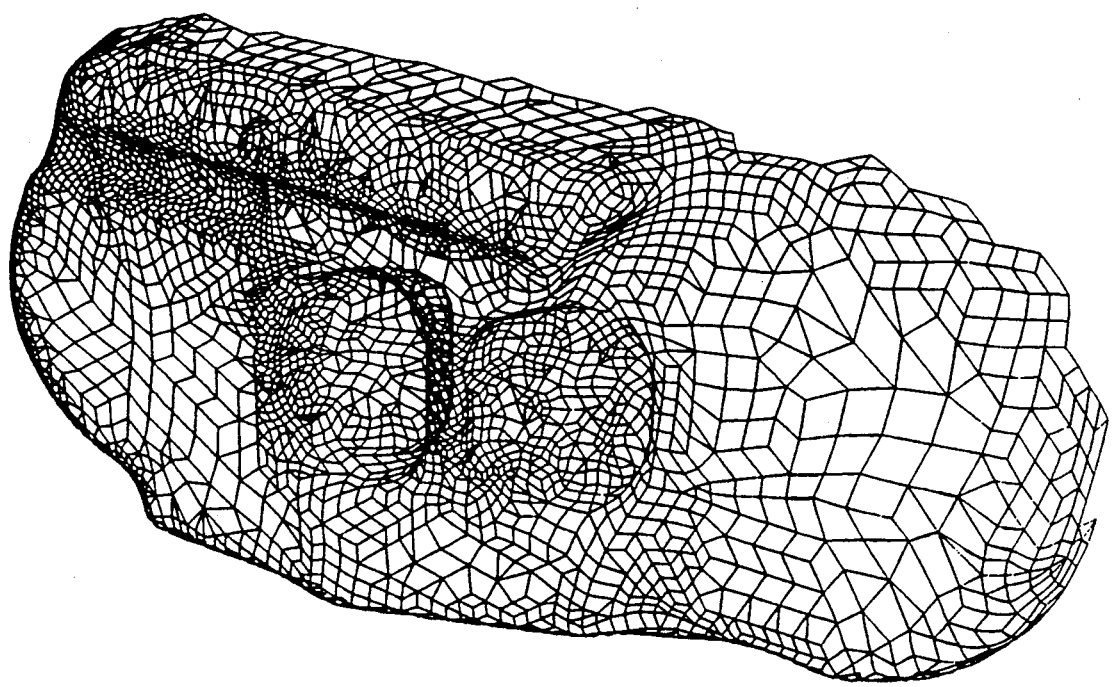
Fig_20_

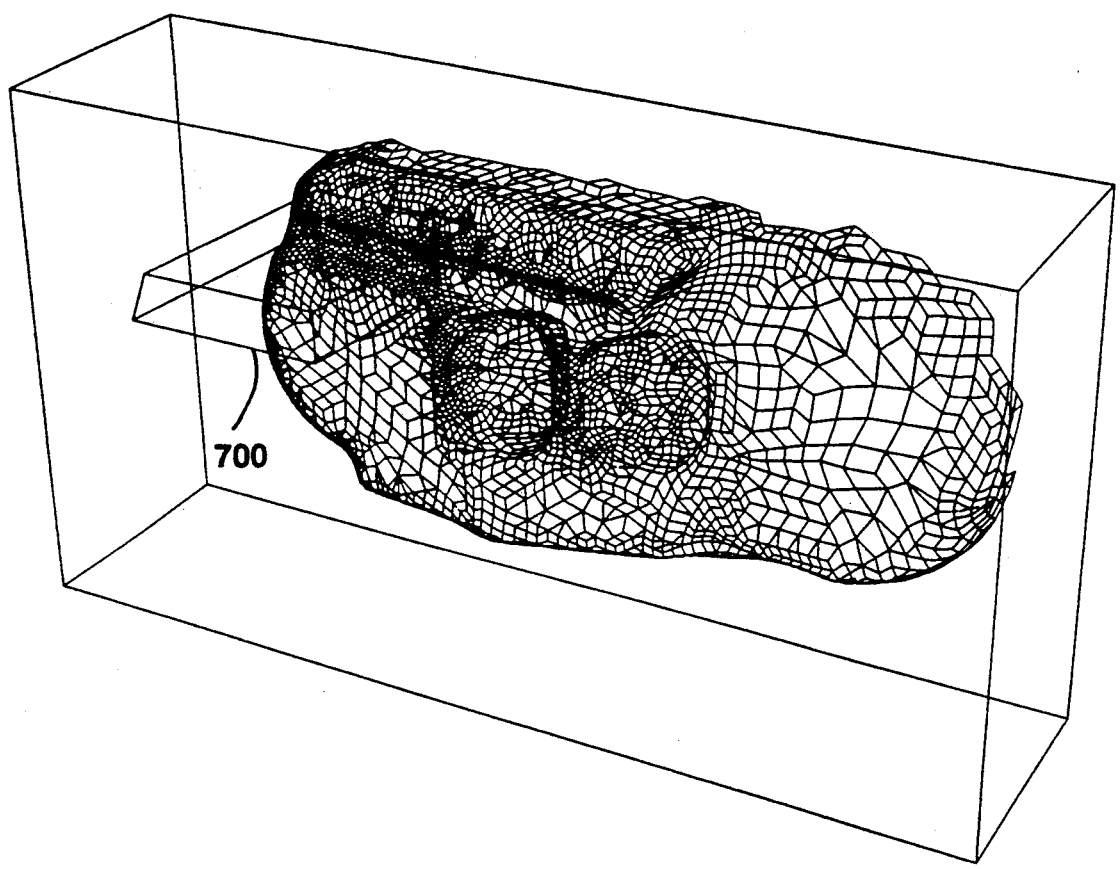
Fig_21_

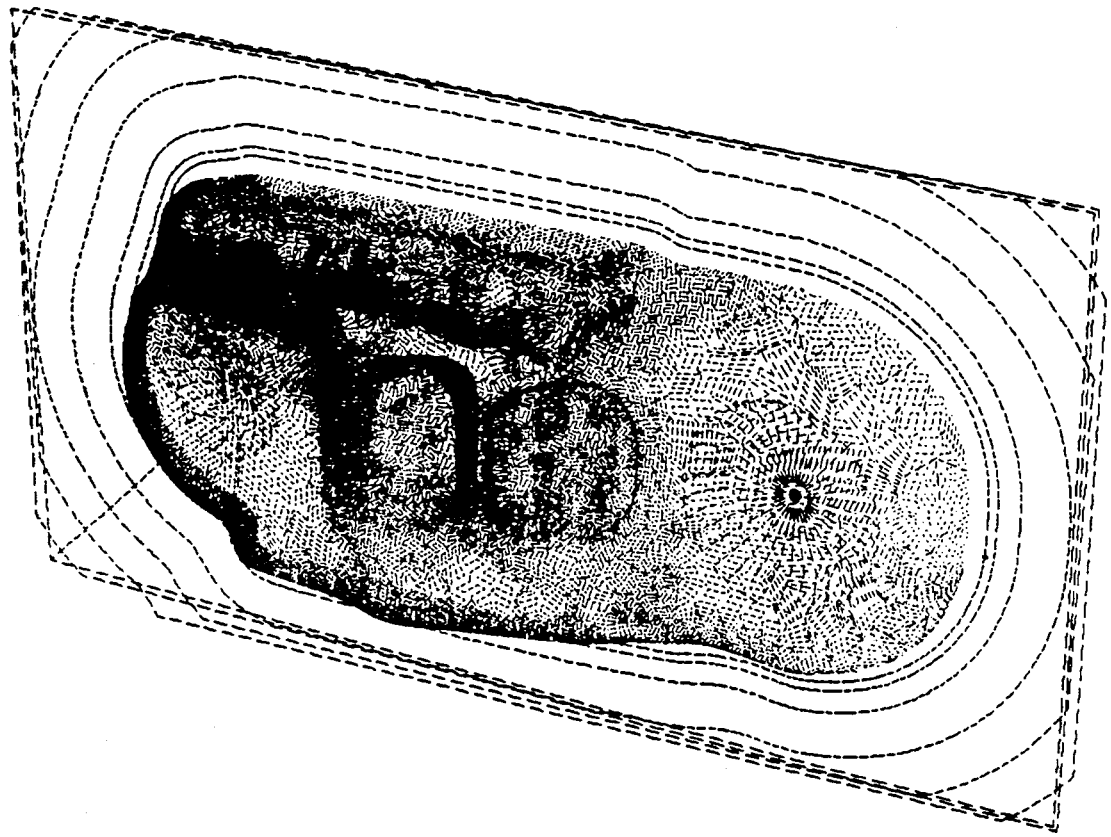
Fig_22_

AUTOMATIC GENERATION OF A SET OF CONTIGUOUS SURFACE PATCHES ON A COMPUTER MODELED SOLID

DESCRIPTION

1. Technical Field

This invention relates generally to a method of operating a computer for generating a plurality of machine tool paths for machining an object and, more particularly, to a method for generating a plurality of machine tool paths from a set of contiguous surface patches arranged on and approximating a computer representation of a solid model.

2. Background Art

In the field of computer aided design and manufacturing, geometric modeling systems, such as PADL-2 marketed by Cornell University, are available for generating structurally complex three dimensional models. These models are normally constructed in a series of steps which include first developing a sharp edged dimensionally accurate solid model. Depending upon the complexity of the model, the time required to produce the solid model varies from hours to months. For example, a part of moderate complexity, such as a die model for a track link forging, requires approximately one month of experienced operator time to complete.

Secondly, it is necessary to replace the undesirable sharp edges and corners with blends of selected radii. This is particularly important when the model is a forging die. Forgings with sharp edges tend to have stress risers concentrated at the sharp edges and resultantly have a greater likelihood of failure. Furthermore, blending improves the flow of hot metal as it assumes the shape imposed by the die. Presently available systems typically accomplish blending as a local modification operation requiring extensive user input Further, system vendor attempts to partially automate the local blending process have not been entirely successful. Moreover, there is a practical limit as to the complexity of the model in order to blend the model using such attempts.

Thirdly, it is advantageous to automatically generate a numerical control tool path to machine the physical model for castings and forgings Numerical control tool paths are generated from a set of surface patches which define the surface of the solid model. However, present methods of producing the surface patches require extensive user input. Without user input, the resulting surface patches produced by the present methods do not truly represent the blended surface.

U.S. Pat. No. 4,791,583 issued to Stephen Colburn describes a method for blending a computer modeled object in a manner that reduces the need for user interaction. Additionally, this method successfully blends objects which previously could not be blended due to the model complexity. The present invention is an improvement on this design.

The present invention is directed to overcoming one or more of the problems as set forth above. In particular, the present invention provides a method for generating machine tools paths from a set of contiguous surface patches which accurately define the surface of the blended solid model and which significantly reduces the need for user interaction.

DISCLOSURE OF THE INVENTION

In one aspect of the present invention, a method of operating a computer for generating a plurality of machine tool paths for machining an object from a set of contiguous surface patches arranged on and approximating a computer representation of a solid model is provided. The solid model has a blended surface in which the solid model is characterized by at least one region having a local blend radius value. Additionally, the computer has a recording medium. The method includes the steps constructing an equilateral triangle defined by a plurality of surface points, each surface point having a gradient vector substantially normal to the surface of the blended solid model. The size of the equilateral triangle is proportional to the local blend radius. Using this triangle as a starting point, a series of steps are performed. A current edge having end points is determined from one of the constructed triangle edges. A candidate point positioned equidistant from the end points of the current edge is generated on the blended surface exterior to the constructed triangle. A subsequent triangle is constructed from the candidate point using the current edge as the subsequent triangle base, the subsequent triangle having an altitude substantially equal to the altitude of the equilateral triangle. The subsequent triangle is defined by a plurality of surface points, each surface point having a gradient vector substantially normal to the surface of the blended solid model. The series of steps are repeated in sequential order upon a previously constructed triangle until the resulting triangular mesh covers a predetermined portion of the solid model. The set of surface points and corresponding gradient vectors which define the surfaces are stored on the recording medium, and the stored information is used to define the set of surface patches and generate the plurality of machine tool paths corresponding to the blended surface for machining the object.

BRIEF DESCRIPTION OF THE DRAWINGS

For a better understanding of the present invention, reference may be made to the accompanying drawings in which:

FIG. 1 illustrates a solid model of a simple three dimensional triangular prism;

FIG. 2a illustrates a "level three" octree representation of a three dimensional triangular prism;

FIG. 2b illustrates a "level four" octree representation of a three dimensional triangular prism;

FIG. 2c illustrates a "level five" octree representation of a three dimensional triangular prism;

FIG. 3a illustrates a cross-section of a blended three dimensional triangular prism having a step size of of twice the blend radius;

FIG. 3b illustrates a cross-section of a blended three dimensional triangular prism having a step size equal to the blend radius;

FIG. 3c illustrates a cross-section of a blended three dimensional triangular prism having a step size of half the blend radius;

FIG. 4 illustrates an embodiment of a method for solving the convolution integral;

FIG. 5 illustrates a flow chart representation of an overall embodiment of the software;

FIG. 6 illustrates a flow chart representation of an embodiment of the overall blending portion of the software;

FIG. 7 illustrates a flow chart representation of an embodiment of the boundary evaluation portion of the software;

FIG. 8 illustrates a flow chart representation of an embodiment of the surface point evaluation portion of the software;

FIG. 9 illustrates one embodiment of a method for generating a surface point within a spheroidal region;

FIG. 10 illustrates one embodiment of a method for constructing the triangular surface mesh;

FIG. 11 illustrates another embodiment of a method for constructing the triangular surface mesh;

FIG. 12 illustrates one embodiment of a method for closing a seam formed by the triangular surface mesh;

FIG. 13 illustrates another embodiment of a method for closing a seam formed by the triangular surface mesh;

FIG. 14 illustrates one embodiment of a method for splitting the triangular surface mesh;

FIG. 15 illustrates another embodiment of a method for splitting the triangular surface mesh;

FIG. 16 illustrates another embodiment of a method for splitting the triangular surface mesh;

FIG. 17 illustrates yet another embodiment of a method for splitting the triangular surface mesh;

FIG. 18 illustrates an unblended three dimensional model of a track link forging die cavity;

FIG. 19 illustrates a blended three dimensional model displaying the triangular surface mesh of a track link forging die cavity;

FIG. 20 illustrates a blended three dimensional model displaying the three and four sided patches of a track link forging die cavity;

FIG. 21 illustrates a blended three dimensional model displaying some clipping bodies positioned relative to the track link forging die cavity; and FIG. 22 illustrates a machined surface of a track link forging die cavity.

BEST MODE FOR CARRYING OUT THE INVENTION

Referring now to the drawings, wherein a preferred embodiment of the present apparatus 10 is shown, FIG. 1 illustrates a relatively simple solid model representation of a triangular prism 12. Such a model is typically generated by an operator at a console as the first step is designing a part with a computer aided design and manufacturing (CAD/CAM) system. One desirable result from a CAD/CAM system is a solid model from which a set of cutting tool paths can be automatically derived to physically reproduce the model from rough stock. However, in a manufacturing environment, it is commonly necessary to produce parts which not only have the sharp edges of the prism 12, but have the more complicated blended corners of preselected radii. Generating a model bounded by a set of intersecting planes, as shown in FIG. 1, is considerably simpler than developing a similar model of the same prism 12 with rounded edges. The method described herein allows the operator to generate the simpler sharp edged models and automatically create a blended model with rounded edges defined by a set of contiguous surface patches.

One approach to blending a solid model is by using a gaussian sphere and a mathematical form called a convolution integral. For example, when a gaussian sphere is placed at a given location, the convolution integral can be solved in closed form if the solid model has a reasonably simple form. A solid model with any degree of geometrical complexity can be subjected to a closed form solution of the convolution integral if the unblended model is first approximated by a set of sufficiently small rectangular blocks or cubes. One such approximation is known as an octree representation The second step in the blending system is illustrated in FIGS. 2a, 2b, and 2c and involves generating the octree representation of the solid model to a preselected minimum cell size. Three such octree representations are shown in FIGS. 2a, 2b, and 2c. For example, the octree begins with a single cube large enough to encompass the entire prism and is then divided into octants (eight identical cubes). The cubes completely outside the prism 12 are discarded. The cubes entirely within the prism 12 are retained and will not be further subdivided Only those cubes which intersect the prism 12 boundary are further subdivided into smaller octants. Only those cubes which intersect the prism 12 boundary are further subdivided into smaller octants. This process continues recursively for a preselected number of iterations which is indicative of a minimum cell size. The three octree representations shown in FIGS. 2a, 2b, and 2c respectively illustrate levels, or iterations, of 3, 4 and 5 having minimum cell sizes of 16, 8 and 4 units, respectively.

The minimum cell size is selected based on two criteria First, the minimum cell size must be less than one-half of the value of the applied blend radius. If this criterion is not met, then the stairstep shape provided by the octree approximation will remain apparent in the blended model. This is illustrated in FIG. 3a, 3b, and 3c, where a blend radius of 8 units has been applied in each of the 3 cross-sections shown. In the first case, the step size is twice the blend radius, while in the second, the step size is equal to the blend radius, with both cases exhibiting a waviness along the diagonal face. In the third case, the cell size criterion has been met, with a step size one half the blend radius The waviness here is negligible being less than one-fiftieth of that shown in the second case.

The other criterion determining the choice of minimum cube size is related to the precision with which the resulting octree approximates the shape of the original unblended model. This precision is improved by a factor of two each time the minimum cube size is halved but memory available to store the resulting octree would be depleted long before a precision sufficient to satisfy common manufacturing tolerances is met. A solution to this problem is obtained by assigning a weighting factor to each of the minimum sized cubes that is intersected by the boundary of the original unblended solid model, as is known in the art. This weighing factor indicates the fraction of the volume of the cube that is inside the unblended solid. By taking into account these weights when the convolution integral is evaluated, surfaces in the blended model can be produced that follow those of the unblended model to within about two percent of the minimum cell size For example, if the manufacturing profile tolerance is given as plus or minus 0.1 millimeter, then the minimum cube size should be no larger than 5 millimeters.

A Monte Carlo technique is employed to calculate individual cell weights. Additionally, the Monte Carlo technique is well known in the art. For each boundary cell, a number of points are randomly generated with Cartesian coordinates falling inside the cell. The points are then classified as being either inside or outside the solid model. The ratio of points inside the model to the total points is the weighting factor assigned to that cell.

An increase in the number of test points per cell produces an increase in precision. The two percent figure stated above corresponds to about 20 test points per cell. This process is repeated for each boundary cell of the octree representation.

A discussion of two additional issues regarding the precision of the blended model requires a closer examination of the convolution process, which is described in five special cases, as illustrated in FIGS. 4a–4e. In FIG. 4a, the blending sphere is shown in correct position for a flat surface One half of the volume of the sphere is inside the object, and one half outside The center point of the sphere defines a point on the boundary of the blended model. In FIGS. 4b and 4c, respectively, the blending sphere is shown in the vicinity of a corner of the original unblended model, the first being concave and the second convex. Once again, these spheres are shown with one half of their volume inside and the other half outside the original unblended model, and with the center point of the sphere, in each case, giving a point on the blended model. FIGS. 4b and 4c suggest the basic blending mechanism, and can be applied to a model of any complexity With this blending mechanism in mind, the first precision issue is examined, referring to it as the curvature affect FIG. 4d shows the blending sphere applied to a solid with a cylindrical shape, where the radius of the unblended cylinder is larger than the blend radius, but not vastly so. It should be evident from the illustration that the condition of balance, with half of the sphere inside and half outside the unblended model does not leave the center of the sphere on the original surface, but slightly to the concave side Thus, the process of blending the cylinder has the effect of shrinking it slightly The same effect is found for other curved surfaces, and can be predicted based on a knowledge of the local curvature. For example, if a cylinder with radius of 100 millimeters is to be blended to a radius of 10 millimeters, the resulting shrinkage, or offset, is found to be about 0.15 millimeters. The offset varies with the square of the blend radius and with the inverse of the local curvature. This problem is solved by offsetting the curved faces of the original unblended model in the direction to oppose the shrinkage, this offsetting being accomplished before the octree is generated.

The second precision issue involves a model that has two or more blend radius values assigned to respective regions on the object Referring to FIG. 4e, it is desired to blend a block 30, such that three of the corners 32,34,36 shown in cross-section receive a blend radius of $R_1$ units, while the fourth corner 38 receives a blend radius of $R_2$ units. This condition is specified by first assigning $R_1$ to the block 30 as the default blend radius, then defining a region 40, here shown as a square drawn with phantom lines, and assigning a radius of $R_2$ to this region.

An analogous situation is found in the study of transient heat flow in a composite infinite media. The unblended model corresponds to an initial temperature distribution, while $R_1$ and $R_2$ denote differing heat conductivity values. The blended model is thought of as a constant temperature surface at a short time after t=o. The surface of the blended model near the interface between the two blending radius regions is an area of concern. In the example shown, the blended surfaces here will remain flat if the blending radius region boundary crosses the boundary of the unblended model at essentially right angles, and if this region extends inward and outward from the original surface by a distance in excess of the larger of the two blend radii. This condition is illustrated in FIG. 4e where the blending sphere has been split at the blending radius region boundary, each part assuming the radius assigned to the respective region. In the octree approximation, a given cell belongs to one and only one region. Thus the region boundaries are also maintained by octree cells. Not only must there be an octree representation of the unblended object but the octree must extend beyond the boundary of the object by a distance in excess of the local blend radius. The portion of the octree exterior of the object will be termed the complementary octree to distinguish it from the portion interior to the object.

A complementary octree is generated in a manner similar to generating the original octree by first creating a cube with the same center of the original octree cube, but twice the size (for example). The previously discarded octree cells are converted to complementary octree cells. Thereafter, each of the converted complementary octree cells which are partially exposed to the initial octree are recursively subdivided. Further, complementary octree cells which span regions of different blend radius are also recursively subdivided.

In an effort to logically and orderly select points for the boundary evaluation, a plurality of rays are defined substantially normal to and intersecting the solid model surface. Rather than select a very large number of points at random, a controlled method of selecting points can provide a much faster boundary evaluation without sacrifice to model accuracy. Points on the ray are iteratively determined to be either inside or outside the boundary until a crossover is determined and must, therefore, be on the boundary. Concentration of the rays in areas of greater curvature helps to produce a boundary with sufficient detail. For example, on a plane surface, relatively few rays are needed as any three points can accurately reproduce the plane. However, on more complex surfaces, such as the junctions of multiple planes, more rays are needed to produce enough points to accurately describe the surface.

In practice the operation is automatically accomplished in which the method of surface representation is based on a triangular grid of points that is generated over the blended surface. The point spacing for the triangular mesh is set proportional to the local blend radius value. Once the triangular mesh completely covers the surface, the method subdivides any triangle that is in an area of high curvature. Wherever possible, two adjacent triangles are paired to define a quadrangular surface patch structured to provide slope continuity across the surface patch boundaries.

The process of iteratively solving for the boundary of the solid model is now described in detail. First the original unblended solid model is expressed as an implicit function:

$$f(x,y,z) = \begin{cases} 1 & \text{inside solid model boundary} \\ 0 & \text{on solid model boundary} \\ -1 & \text{outside solid model boundary} \end{cases}$$

It is a basic capability of any true solid modeling system to evaluate this function for any given model represented by such a system. That is, given a point (x,y,z) in space, the solid modeling system can determine if the point is inside, on, or outside the boundary of the object. In addition to the function f(x,y,z) that defines the unblended solid model, a function h(x,y,z) is needed, centered at the origin and defining the blending sphere. The contribution of the portions of the sphere that may be either inside or outside the unblended object is given by an integral g over the product of f and h:

$$\int \int_{-\infty}^{\infty} \int f(x',y',z')h(x'-x, y'-y, z'-z)dx'dy'dz'$$

such that the blending sphere is now centered at the point where g is to be evaluated, and is known as a convolution integral.

The precise form of the blending sphere h must be specified if the integral g is to be evaluated. Two such forms are described, the hard sphere and the gaussian sphere. For the hard sphere, the function h assumes a positive constant value inside the spherical domain, and zero outside, while the value of h for the gaussian sphere varies smoothly from some positive maximum value at the center of the sphere according to the gaussian function. In either case the function h is normalized according to:

$$\int \int_{-\infty}^{\infty} \int h(x,y,z)dxdydz = 1$$

so that the two forms are expressed as:

$$h(x,y,z)_{sphere} = \left(\frac{1}{\sqrt{\pi}\alpha R}\right)^3 e^{(\frac{1}{\alpha R})^2(x^2+y^2+z^2)} \text{ gaussian}$$

$$h(x,y,z) = \begin{cases} \frac{3}{4\pi R^3} & \text{inside} \\ 0 & \text{outside} \end{cases} \text{ hard sphere}$$

where:
R = blend radius
α = numerical constant

In the case of the hard sphere, the convolution integral can be evaluated directly using a solid modeler that has the following functions:
1. Boolean intersection and difference of two solids;
2. Volume evaluation for a solid.

Thus, to evaluate g for a hard blending sphere at some given location, a solid corresponding to the portion the sphere inside the unblended solid is obtained as the Boolean intersection of the solid and the sphere, while that portion of the sphere lying outside is obtained as the Boolean difference of the blending sphere and the solid. The volume of each resulting solid is obtained, then the value of g is obtained as the arithmetic difference of the value of the volume of the portion of the sphere found inside, and the volume of the remaining portion of the sphere.

Although repeated application of these operations would produce a set of points on the blended object, the process would be slow. For this reason the object to be blended is first approximated as a set of cubes by the octree representation, then the integral g is repeatedly evaluated using the gaussian sphere for each cube and the results summed.

The convolution integral g can be written as the sum of an integral over each cell in an octree. Since an octree cell is either inside the object where f = +1, or outside where f = −1, two terms result:

$$g(x,y,z) =$$

$$\sum_{\substack{\text{inside} \\ \text{cube } i=1}}^{n} \int \int_{\text{cube } i} \int h(x'-x, y'-y, z'-z)dx'dy'dz' -$$

$$\sum_{\substack{\text{outside} \\ \text{cube } j=1}}^{m} \int \int_{\text{cube } j} \int h(x'-x, y'-y, z'-z)dx'dy'dz'$$

where the limits of integration are the boundaries of the octree cube currently being evaluated.

The solution to this equation for a specific cube may be useful in understanding the process as a whole. First, the cube being evaluated is defined as being located at $(X_c, Y_c, Z_c)$ and having side dimensions of 2s. To perform the integration it is necessary to define the limits of integration as the coordinates of the faces of the cube and to substitute the gaussian form of h.

$$g_{cube} = \int_{x'=x_c-s}^{x_c+s} \int_{y'=y_c-s}^{y_c+s} \int_{z'=z_c-s}^{z_c+s} \left(\frac{1}{\sqrt{\pi}\alpha R}\right)^3 e^{-(\frac{1}{\alpha R})^2((x'-x)^2+(y'-y)^2+(z'-z)^2)} dx'dy'dz'$$

Thus, using the gaussian sphere, each of the three integrals are of the same form (separable) and it is only necessary to solve one and apply the solution to the remaining integrals.

$$H_x = \left(\frac{1}{\sqrt{\pi}\alpha R}\right) \int_{x_c-s}^{x_c+s} e^{-(\frac{1}{\alpha R})^2(x'-x)^2} dx'$$

substituting, $$\frac{1}{\alpha R}(x'-x) = u$$

then, $dx' = \alpha R du$.

For the lower limit where $x' = x_c - s$, then $$u = \frac{1}{\alpha R}(x_c - s + x)$$

For the upper limit where $x' = x_c + s$. Then $$u = \frac{1}{\alpha R}(x_c - s - x)$$

The equation becomes:

$$Hx = \frac{1}{\sqrt{\pi}} \int_{\frac{1}{\alpha R}(x_c - s + x)}^{\frac{1}{\alpha R}(x_c + s - x)} e^{-u^2} du$$

by definintion, the integral of $e^{-u^2}$ is called the "error function", erf(x), such that:

$$erf(x) = \frac{2}{\sqrt{\pi}} \int_0^x e^{-u^2} du$$

Using this definition $H_x$ can be further simplified:

$$H_x = \frac{1}{2}\left(erf\left(\frac{x - (x_c - s)}{\alpha R}\right) - erf\left(\frac{x - (x_c + s)}{\alpha R}\right)\right)$$

similarly, $$H_y = \frac{1}{2}\left(erf\left(\frac{y - (y_c - s)}{\alpha R}\right) - erf\left(\frac{y - (y_c + s)}{\alpha R}\right)\right)$$

and, $$H_z = \frac{1}{2}\left(erf\left(\frac{z - (z_c - s)}{\alpha R}\right) - erf\left(\frac{z - (z_c + s)}{\alpha R}\right)\right)$$

thus, $$g_{cube} = H_x H_y H_z$$

The result is a blended cube and the sum of all the cubes of the octree gives an implicit function representing the blended object.

FIGS. 5 to 8 are flowcharts illustrating a computer software program for implementing the preferred embodiment of the present invention. The program depicted in these flowcharts is particularly well adapted for use with a CAD/CAM system. These flowcharts constitute a complete and workable design of the preferred software program, and have been reduced to practice on the APOLLO microcomputer system. The software program may be readily coded from these detailed flowcharts using the instruction set associated with this system, or may be coded with the instructions of any other suitable conventional microcomputer. The process of writing software code from flowcharts such as these is a mere mechanical step for one skilled in the art.

A top level view of the process is shown in FIG. 5. The process begins with the user creating a new solid model or modifying an existing solid model using one of the commercially available solid modelers. Preferably, the solid modeler is PADL-2 marketed by Cornell University; however, other programs may be readily substituted. The product of the solid modeler is an unblended sharp edged model with the desired blend radius values assigned to the corresponding regions of the model as attributes These regions are constructed as solids of the type supported by the solid modeler.

Subsequently, the solid model is passed to the blending program to produce a blended model. The radius of the edges correspond to the blend radius values assigned by the operator during the modeling process. A sculptured surface model defined by a set of contiguous surface patches arranged on and approximating the computer representation of the blended solid model is the result of this step.

Once the set of contiguous surface patches has been generated on the model, the various functions of the CAD/CAM modeling system may be exercised such as displaying the model, performing finite element analysis on the model, and generating numerical control machine tool paths for making the model. The machine tool paths, when applied to an NC programmable machine, result in a physical reproduction of the computer model of the piece part.

The global blending process is described in conjunction with the flowchart of FIG. 6. The process begins by generating the previously discussed octree representation of the solid model as shown in the block 605. The blend radius values assigned during the solid modeling are assigned to the corresponding octree cells. This approach is known to those skilled in the art and hence will not be further discussed.

Control continues to the block 610 once the basic octree is complete. Then the weighting factors are assigned to each of the boundary octree cells by the Monte Carlo method previously described.

While the generation of the octree is currently performed by the program, it is recognized that this process could also be omitted without departing from the spirit of the present invention.

Once the steps described in the blocks 605 and 610 are completed, the solid model surface is implicitly defined by the function:

$$g(x,y,z) = 0$$

In order to make this function explicit, the program solves the convolution integral to define a plurality of points on the boundary. Proceeding to the block 620 the boundary of the blended object is evaluated by applying the convolution integral blending method. Control then passes to the block 625 where the set of contiguous surface patches are generated. The surface patches define the boundary of the blended solid model. The surface patches have either three sides (triangular) or four (quadrilateral) and "tile" the surface of the blended model. A triangular mesh of points serves to define the corners of these patches, with a triangular patch resting on exactly one triangle of the mesh and a quadrilateral patch on two adjacent triangles.

The process of evaluating the boundary of the blended solid model is described in greater detail in conjunction with the flowchart of FIG. 7. Referring now to FIG. 7, the boundary evaluation process begins by defining the boundary of the blended solid model by constructing the triangular mesh one triangle at a time. The block 705 involves constructing an equilateral triangle 100 defined by a plurality of surface points Each surface point has a gradient vector substantially normal to the surface of the blended solid model. Additionally the size of the equilateral triangle 100 is proportional to the local blend radius. In the preferred embodiment the size of the equilateral triangle 100 is equal to 1.2r, for example, where r is the blend radius value. The placement of the equilateral triangle 100 is arbitrary and may be predefined in software.

To determine each point on the surface of the blended solid model, predetermined steps must be accomplished by the program. Referring to FIG. 8, the block 805 includes the step of defining a ray substantially normal to and intersecting the solid model surface.

Once the ray is properly defined then the program begins to solve the convolution integral in the block 810 for the point at which the ray intersects the blended solid model surface. The blending radius value and weight of the cell being evaluated is substituted into the equation:

$$g_{cube} = H_x H_y H_z$$

The coordinates of the center of each cell ($X_{ci}$, $Y_{ci}$, $Z_{ci}$) and one-half the cell dimension $s_i$ are similarly substituted into the equation. The numeric solution for each of the cells within a preselected distance of the evaluation point is successively adjusted until the numeric solutions sum to the value zero. This evaluation point is a point on the surface of the blended object. Control then passes to the block 815 where a differential of the convolution integral is evaluated at a location along each ray corresponding to the surface point. The solution of the differential of the convolution integral determines the gradient vector.

Adverting back to FIG. 7, the program continues to the block 710 where a current edge 105 is determined. The current edge 105 has two end points and includes one of the constructed triangle edges. In the block 715 the program generates a candidate point 110 positioned equidistant from the end points of the current edge 105 on the blended surface exterior to the constructed triangle and control passes to the block 720. In the block 720 the program constructs a spheroidal region 115 around the candidate point 110. The program then determines if any surface points lie within the spheroidal region 115. The spheroidal region 115 passes through the two end points of the current edge 105 and has an axis of symmetry that bisects the current edge 105. The spheroidal region 115 extends beyond the candidate point 110 by a distance equal to 0.618 times the altitude (h) of a subsequent triangle 120 tentatively constructed from the candidate point 110 and the current edge 105 and is generally shown in FIG. 9.

Referring back to FIG. 7, control then passes to the block 725 wherein the program constructs the subsequent triangle 120 from the candidate point 110 using the current edge 105 as the subsequent triangle base, if no surface points are determined to lie within the spheroidal region 115. Therefore, the spacing of the surface points is held to be uniform and potential conflicts consisting of overlapping triangles is avoided. The equilateral triangle 100 is shown in solid lines and the subsequent triangle 120 is shown in dashed lines as illustrated in FIG. 10. Furthermore, the subsequent triangle 120 has an altitude substantially equal to the altitude of the equilateral triangle and is defined by a plurality of surface points. Each surface point of the subsequent triangle 120 has a gradient vector substantially normal to the surface of the blended solid model.

If a surface point does lie within the spheroidal region 115 then the resulting geometric configuration must be examined to determine if the candidate point 110 should be completely abandoned thereby conforming the subsequent triangle 120 to the existing local geometric configuration. This is explained below.

Assuming a surface point lies within the spheroidal region 115, the program then determines if the candidate point 110 is within a predetermined angular distance Θ of a surface point 200 associated with an adjacent triangle 205 as shown by FIG. 11. If the candidate point 110 is within 20°, for example, of the surface point 200 the program will then abandon the candidate point 110 and construct the subsequent triangle 120 from the surface point 200 of the adjacent triangle 205.

The program continues the processes involved in the blocks 710-725 in sequential order upon a previously constructed triangle until the resulting triangular mesh covers a predetermined portion of the solid model as shown by the block 730. The predetermined portion is defined in a region which encloses a selected portion of the solid model. Those skilled in the art will recognize that the altitude of the triangles to be constructed may be substantially equal to the altitude of the equilateral triangle or to the altitude of a previously constructed triangle. Additionally, the predetermined portion is set in software by the operator.

As the program continues to generate the triangular mesh on the surface of the blended solid model, the triangular mesh forms a bounding loop of edges 300. This is illustrated in FIG. 12. The program Constructs the subsequent triangles exterior to the bounding loop in a preselected direction. Additionally, the program determines if the bounding loop of edges 300 form a seam 305 having a base 310. The seam 305 is a narrow opening with a predetermined width. Additionally, the spheroidal region 115 defines the seam 305. For example, if the spheroidal region passes through or includes edges opposite the current edge, then a seam is determined to exist. In the exemplary embodiment, the predetermined width may vary between 0.618h and 1.618h, for example, depending on the size of the spheroidal region.

Additionally with reference to FIG. 12, the program generates the candidate point from one of a plurality of edges forming the base 310 of the seam 305. The base 310 includes the edges which terminate the opening of the seam 305, creating a closed end. During the generation of the triangular mesh the program determines the current edge from the base 310 such that the generated candidate point results in a subsequent triangle which is nearer to an equilateral triangle than all other possible subsequent triangles constructed from the base 310 of the seam 305. For example, the trapezoid 1234 may be divided into a pair of triangles along edge 24 or along edge 13. Thus, the program has a choice of triangles to construct and in this example the program will choose 234. The program will continue and progress will be made at the base 310 of the seam 305. The seam 305 will close by constructing subsequent triangles at the base 310 of the seam 305 while traversing the seam 305 in the preselected direction. In this manner the program generates triangles such that the seam 305 closes in a manner similar to closing a zipper.

When the region to be meshed has one or more "holes", then a different strategy is employed for closing the seam. A "hole" 400 is a region defined by the user which excludes the triangular mesh. Additionally, a triangle is not allowed to wholly exist in the "hole" 400 but may partially exist in the "hole" 400. For a seam to terminate properly which includes a "hole" 400, the seam must be "bridged" by at least one triangle. For example, the program determines if subsequent triangles have been constructed upon a complete traversal of the bounding loop 300. The program then constructs a subsequent triangle 120 across the seam 305 only if no subsequent triangles have been constructed upon a complete traversal of the bounding loop 300. This is shown in FIG. 13. The program generates the candidate point 110, and since the generated candidate point 110 lies within a predetermined distance of a surface point 415 of a triangle 420 opposite the current edge 105, then the subsequent triangle 120 is generated from the existing surface point 410 and the current edge 105. This results in two bounding loops 405,410. Additionally, the two dashed sides of the subsequent triangle 120 serve as the base for each of the seams of the loops 405,410. The program continues generating the mesh along one of the loops 405,410 until one of the loops close, then the program generates the mesh along the other loop. In the preferred embodiment, the program will "selectively" bridge a seam. For example, when the program starts generating the triangular mesh, the bridging function will be "off" and hence no bridging will occur. However, if no triangles have been generated on a complete traversal along a bounding loop, then the bridging function will turn "on" long enough to permit one triangle to bridge across a seam. Subsequently the bridging function will turn "off" again.

After the triangular mesh covers the preselected area, the program splits the triangular mesh into smaller triangles providing for greater accuracy of the representative blended solid model. For example, and as shown in FIG. 14, the program determines a midpoint 500 for each of the edges of a triangle 505 which has a local curvature greater than a predetermined value. Each midpoint 500 includes a ray orientated in a direction substantially normal to the surface. The program determines a resolution point 510 which defines the curved surface. The resolution point 510 is calculated as described previously, by iterating along the ray. Accordingly, the program constructs four smaller triangles 515 from the triangle 505. The smaller triangles 515 are defined by the resolution points 510 and each resolution point 510 has a gradient vector substantially normal to the surface of the blended solid model. Advantageously, the program will determine a resolution point for each edge corresponding to a triangle displaying a large amount of curvature. In the preferred embodiment, a large amount of curvature is defined as a condition where any of the three gradient vectors corresponding to the three surface points deviate by more than 6°, for example, from a normal vector corresponding to the plane of the triangle.

In another example, when two triangles are adjacent to each other and only one triangle is split into four triangles, a small discontinuity results. In general, discontinuities are not allowed; therefore, the triangle which was not split, is then split into two triangles, preventing the discontinuity. This is shown in FIG. 15, where triangle ABC is split into four smaller triangles and triangle DEF is split by the dashed line 600 into triangle DEC. More complicated cases are shown in FIGS. 16 and 17. For example, FIG. 16 illustrates a case where a "flat" triangle GHI is split into three triangles, shown by the dashed lines. In this case the "flat" triangle GHI lies next to two other triangles JKG,HLM which are both split into four triangles. A "flat" triangle is a triangle displaying essentially no curvature. Another example is shown in FIG. 17 where a "flat" triangle NOP lies next to three triangles QRN,OST,UPV split into four triangles. In this case the "flat" triangle NOP is split into four triangles.

As stated earlier the program will join two subsequent triangles creating a quadrangular surface patch which is defined by the vertices of the joined triangles wherever possible. This allows the generated tool paths to be larger and hence, results in a faster machining process than a process which machines a smaller area.

The computer embodying the CAD/CAM system employs a recording medium. The recording medium may include RAM, ROM, CDROM, or any other electrical, optical, or magnetic recording device. The program stores the set of surface points and corresponding gradient vectors which define the contiguous surfaces on the recording medium. This may be accomplished in many ways. One way, for example, is to represent the information as digital bits and store the information on a hard disc drive contained in the CAD/CAM system.

The CAD/CAM system utilizes the stored set for defining the set of surface patches and generating the plurality of machine tool paths which correspond to the blended surface for machining the object. An example is described below.

INDUSTRIAL APPLICABILITY

In the overall operation of the global blending process, the system begins with a standard geometric modeling program. An operator initially designs a solid model representation of a piece part. The part is dimensionally accurate with highly defined surfaces and simple sharp edges. The operator is also required to input the desired blend radius values for each region.

Subsequent operator intervention is not required. The global blending software utilizes the operator prepared information to generate an octree and complementary octree representation of the piece part. The weighting system is then employed to enhance the accuracy of the blended model. The majority of the processing time is consumed in the repeated ray tracing solution to the convolution integral defining the surface points of the blended solid model. For example, an APOLLO model DN 10000 exclusively operating the global blending software upon the solid model of the track link forging of FIG. 18 required between 4 and 5 hours of CPU time to produce the blended surface model of FIGS. 19 and 20. FIG. 19 illustrates the triangular mesh on the blended surface model, and FIG. 20 illustrates the large number of four sided and three sided patches on the blended surface model. This can be compared to a similar exercise wherein an experienced operator created a tracklink model using the traditional construction techniques and local blending on ANVIL-4000. The elapsed time was about 3 months, while the CPU time expended was comparable to that required by the global blending system.

Once the set of contiguous surface patches cover the blended model, the surface points are stored in the CAD/CAM system memory. From the stored information, a list of tool tip coordinates are computed from the known point of contact of the tool with the surface and a corresponding gradient vector. Each tool tip location is expressed in standard APT language format. The file containing the APT language format is then postprocessed to produce a tool path program for a specific machine tool for example, a copy mill supplied by Rambubaudi as model number E/1000 with a Fidia CNC 12 controller.

Part of the machining includes a tool description and may include a ball nose or a bull nose tool. A die or pattern half may be machined from either side of the blended surface model to produce either the female or male version of the shape.

Next, the tool path is broken down into rough and finish cuts. It is desirable to use as large a cutter as is practical relative to the concave blends. When a model has more than one blend radius region, then it is good practice to machine as much as possible with a tool compatible with the largest concave blend, then change to successively smaller tools to reach the regions of smaller blend radius. To select patches in these regions, a general patch selection function is provided based on a clipping body. The clipping body is constructed to have a shape that either encloses or excludes the set of patches to be selected and is shown generally in FIG. 21. FIG. 21 shows a small rectangular region 700 of small concave blend radius. The surface inside the region 700 is to be machined with a smaller tool than the rest of the model.

Starting with an arbitrary patch in the region, another patch is selected and this process continues until all the patches in the region are selected. The set of contiguous patches is saved and used to control machining order. During tool path generation on successive patches in one of the regions, a patch may be machined in its entirety or the tool path may be limited. A machined surface is shown in FIG. 22. The path illustrated is a rough cut.

The automatic nature of the blending and numerical control tool path generation and subsequent machining process serves to reduce lead time significantly. After the first model is produced, the nature of the part and process definition permit a rapid response to an engineering design change. Thus, a manufacturing system which responds quickly to engineering and manufacturing changes is realized.

Other aspects, objects and advantages of the present invention can be obtained from a study of the drawings, the disclosure and the appended claims.

I claim:

1. A method of operating a computer for generating a plurality of machine tool paths for machining an object from a set of contiguous surface patches arranged on and approximating a computer representation of a solid model, said solid model having a blended surface wherein the solid model is characterized by at least one region having a local blend radius value, said computer having a recording medium, comprising the steps of:
   (a) constructing an equilateral triangle defined by a plurality of surface points, each surface point having a gradient vector substantially normal to the surface of the blended solid model and wherein the size of said equilateral triangle is proportional to the local blend radius;
   (b) determining a current edge having end points from one of said constructed triangle edges;
   (c) generating a candidate point positioned equidistant from the end points of said current edge on the blended surface exterior to said constructed triangle;
   (d) constructing a subsequent triangle from the candidate point using the current edge as the subsequent triangle base, said subsequent triangle having an altitude substantially equal to the altitude of the equilateral triangle and wherein said subsequent triangle is defined by a plurality of surface points, each surface point having a gradient vector substantially normal to the surface of the blended solid model;
   (e) continuing the steps of (b), (c), and (d) in sequential order upon a previously constructed triangle until the resulting triangular mesh covers a predetermined portion of the solid model;
   (f) storing the set of surface points and corresponding gradient vectors which define the surfaces on said recording medium; and
   (g) utilizing said stored information to define said set of surface patches and generate the plurality of machine tool paths corresponding to the blended surface for machining said object.

2. A method, as set forth in claim 1, including the step of defining a plurality of rays substantially normal to and intersecting the solid model surface.

3. A method, as set forth in claim 2, wherein said solid model includes an octree representation having a plurality of cells, wherein each cell of the octree has a blend radius value.

4. A method, as set forth in claim 3, including the step of repetitively solving a convolution integral in an iterative manner at a plurality of locations along each ray for determining said surface point, wherein the convolution integral includes a gaussian sphere blending factor with a size responsive to the blend radius of said octree cell.

5. A method, as set forth in claim 4, including the step of solving a differential of the convolution integral at a location along each ray corresponding to the surface point, wherein the solution of the differential of the convolution integral determines the gradient vector.

6. A method, as set forth in claim 1, including the step of joining two subsequent triangles creating a quadrangular surface patch which is defined by the vertices of said joined triangles and the respective gradient vectors.

7. A method, as set forth in claim 1, wherein said triangular mesh has at least one large curvature triangle which has a local curvature greater than a predetermined value, and including the step of determining a resolution point for each of the edges of said large curvature triangle.

8. A method, as set forth in claim 7, wherein the step of claim 7 includes the step of constructing four smaller triangles from said large curvature triangle, said smaller triangles being defined by the resolution point of the edges of said large curvature triangle, and wherein each resolution point has a gradient vector substantially normal to the surface of the blended solid model.

9. A method, as set forth in claim 1, including the step of constructing a spheroidal region around the candidate point.

10. A method, as set forth in claim 9, including the step of determining if any surface points lie within said spheroidal region, said spheroidal region passes through the two end points of the current edge and has an axis of symmetry that bisects the current edge.

11. A method, as set forth in claim 10, wherein the step (d) includes the step of constructing said subsequent triangle from said candidate point only if no surface points lie within said spheroidal region.

12. A method, as set forth in claim 11, wherein the step (d) includes the steps of abandoning said candidate point and constructing the subsequent triangle from a surface point of an adjacent triangle, when said candidate point is within a predetermined angular distance of said surface point.

13. A method, as set forth in claim 12, wherein the subsequent triangles form a bounding loop of edges and including the step of constructing said subsequent triangles exterior to said bounding loop in a preselected direction.

14. A method, as set forth in claim 13, including the step of determining if the bounding loop of edges form a seam having a base, said seam being an opening having a predetermined width.

15. A method, as set forth in claim 14, including the step of determining the current edge from one of a plurality of adjacent edges forming the base of said seam.

16. A method, as set forth in claim 15, including the step of determining the current edge from the base of said seam such that the generated candidate point results in a subsequent triangle which is nearer to an equilateral triangle than all other possible subsequent triangles constructed from the base of said seam.

17. A method, as set forth in claim 16, including the step of closing said seam by constructing subsequent triangles at the base of said seam while traversing said seam in said preselected direction.

18. A method, as set forth in claim 17, including the steps of determining if subsequent triangles have been constructed upon a complete traversal of said bounding loop, and constructing a subsequent triangle such that said subsequent triangle bridges across said seam resulting in two bounding loops, only if no subsequent triangles have been constructed upon a complete traversal of said bounding loop.

* * * * *